(12) United States Patent
Gonigberg et al.

(10) Patent No.: US 11,929,869 B2
(45) Date of Patent: Mar. 12, 2024

(54) SCALABLE AND REAL-TIME ANOMALY DETECTION

(71) Applicant: NETFLIX, INC., Los Gatos, CA (US)

(72) Inventors: Arthur Gonigberg, San Jose, CA (US); Michael Lloyd Cohen, Santa Cruz, CA (US); Neeraj Joshi, San Jose, CA (US); Cody Mitchell Rioux, San Jose, CA (US)

(73) Assignee: NETFLIX, INC., Los Gatos, CA (US)

(*) Notice: Subject to any disclaimer, the term of this patent is extended or adjusted under 35 U.S.C. 154(b) by 31 days.

(21) Appl. No.: 16/410,867

(22) Filed: May 13, 2019

(65) Prior Publication Data

US 2019/0349247 A1 Nov. 14, 2019

Related U.S. Application Data

(60) Provisional application No. 62/671,075, filed on May 14, 2018.

(51) Int. Cl.

| | |
|---|---|
| *H04L 41/0681* | (2022.01) |
| *H04L 41/0604* | (2022.01) |
| *H04L 41/0631* | (2022.01) |
| *H04L 43/04* | (2022.01) |
| *H04L 43/0817* | (2022.01) |

(Continued)

(52) U.S. Cl.
CPC ...... *H04L 41/0681* (2013.01); *H04L 41/0609* (2013.01); *H04L 41/0631* (2013.01); *H04L 43/04* (2013.01); *H04L 43/0817* (2013.01); *H04L 43/0823* (2013.01); *H04L 43/16* (2013.01)

(58) Field of Classification Search
CPC ..... H04L 43/04; H04L 43/08; H04L 43/0823; H04L 43/16; H04L 41/0604; H04L 41/0609; H04L 41/0631; H04L 41/0654; H04L 41/0681; H04L 43/045; H04L 43/067; H04L 41/064
See application file for complete search history.

(56) References Cited

U.S. PATENT DOCUMENTS 9,323,599 B1 * 4/2016 Iyer .................. G06F 11/30
9,350,601 B2 5/2016 Jain
(Continued)

OTHER PUBLICATIONS

International Search Report for application No. PCT/US2019/032311 dated Aug. 14, 2019.

(Continued)

*Primary Examiner* — Emmanuel L Moise
*Assistant Examiner* — Xiang Yu
(74) *Attorney, Agent, or Firm* — Artegis Law Group, LLP

(57) ABSTRACT

Various embodiments of the disclosure disclosed herein provide techniques for detecting anomalies across one or more components within a distributed computing system, according to various embodiments of the present disclosure. An anomaly detection system retrieves event data associated with a real-time stream of events generated by one or more components within a distributed computing system. The anomaly detection system computes a failure metric based on the event data. The anomaly detection system determines that the failure metric exceeds a dynamically adjustable trigger condition. The anomaly detection system generates an alert associated with the failure metric.

16 Claims, 12 Drawing Sheets

(51) Int. Cl.
   *H04L 43/0823*   (2022.01)
   *H04L 43/16*     (2022.01)

(56) References Cited

U.S. PATENT DOCUMENTS

| | | | |
|---|---|---|---|
| 10,084,665 B1* | 9/2018 | Arunachalam | H04L 67/52 |
| 2005/0138463 A1* | 6/2005 | Bolt | H04L 43/00 |
| | | | 714/4.1 |
| 2015/0082432 A1* | 3/2015 | Eaton | H04L 43/16 |
| | | | 726/23 |
| 2016/0066042 A1* | 3/2016 | Dimov | H04N 21/4334 |
| | | | 725/34 |
| 2017/0070414 A1* | 3/2017 | Bell | H04L 43/16 |
| 2017/0299645 A1* | 10/2017 | Wang | G06F 11/3051 |
| 2018/0067821 A1* | 3/2018 | McHugh | G06F 11/0754 |
| 2018/0114271 A1* | 4/2018 | Jhoney | G06F 11/0751 |
| 2019/0188107 A1* | 6/2019 | Alston | G06F 9/5072 |
| 2019/0379589 A1* | 12/2019 | Ryan | G06F 17/142 |
| 2020/0073740 A1* | 3/2020 | Ohana | G06F 11/0793 |
| 2021/0089927 A9* | 3/2021 | Ryan | G06F 11/0754 |
| 2021/0349759 A1* | 11/2021 | Bansal | G06F 9/5083 |
| 2022/0027431 A1* | 1/2022 | Zheng | H04L 67/55 |

OTHER PUBLICATIONS

Netflix Technology Blog, "Stream-processing with Mantis", Mar. 14, 2016, 12 pages.

* cited by examiner

TIMELINE OF EVENTS

7:11:33 AM – Zuul–Website (cluster), API Service (origin) started having connectivity issues at 13.08%

7:12:10 AM – API Service (origin) started failing with timeouts at 1.29%

7:12:22 AM – Zuul–Website (cluster) started failing with timeouts at 1.78%

7:14:50 AM – API Service (origin) started throttling retries (e.g. retry storm) at 43.86%

7:14:52 AM – Zuul–API (cluster), API Service (origin) started throttling retries (e.g. retry storm) at 63.12%

7:14:52 AM – Zuul–API (cluster) started throttling retries (e.g. retry storm) at 60.24%

FIGURE 5

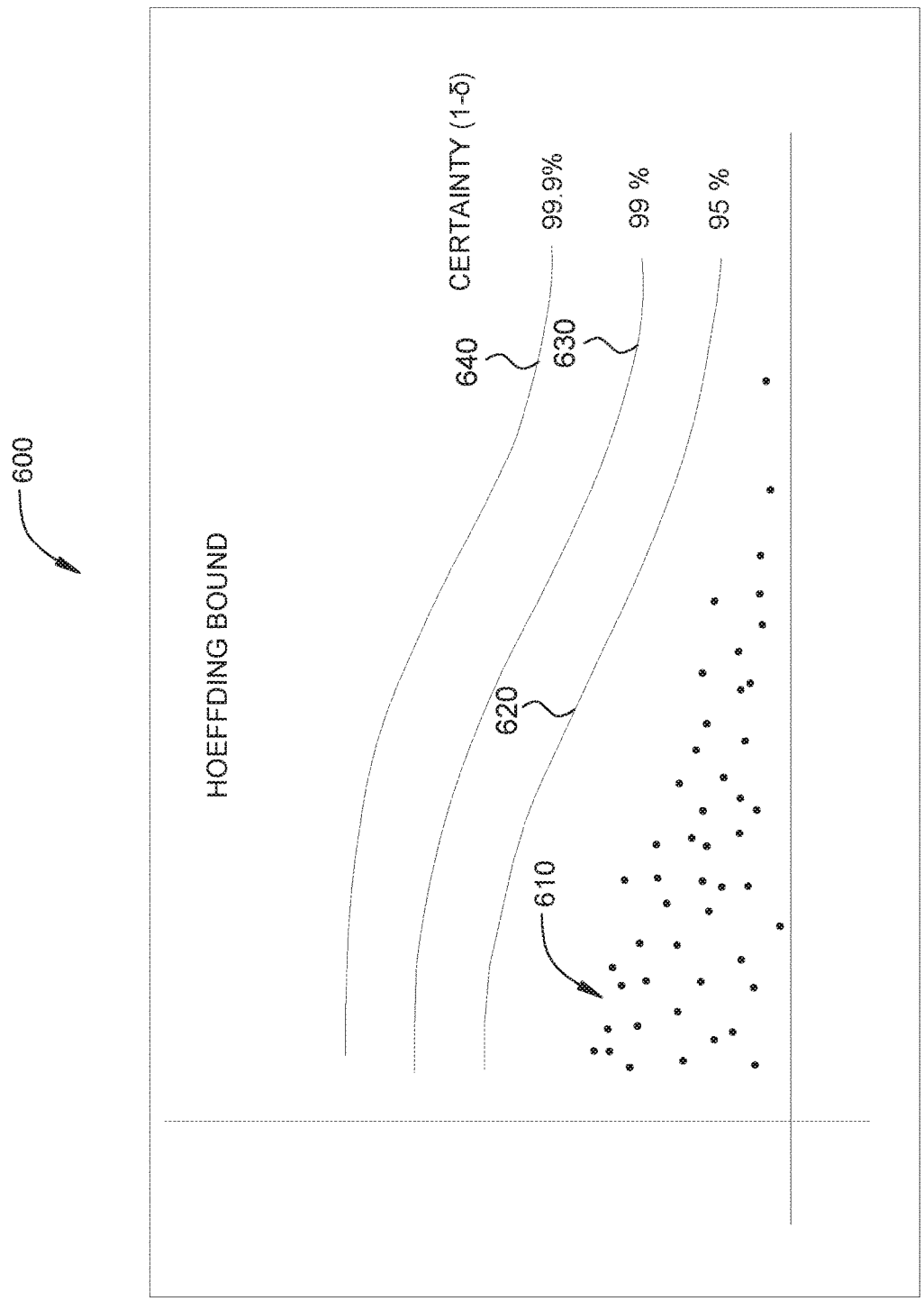

SCALABLE AND REAL-TIME ANOMALY DETECTION

CROSS REFERENCE TO RELATED APPLICATION

This application claims priority benefit of U.S. Provisional Patent Application Ser. No. 62/671,075 filed May 14, 2018, entitled "CLOUD GATEWAY ARCHITECTURE." This application is hereby incorporated herein by reference.

BACKGROUND

Technical Field

The present disclosure relates generally to distributed computing systems and, more specifically, to scalable and real-time anomaly detection.

Description of the Related Art

Distributed computing systems include many different hardware and software components that operate in conjunction to provide a variety of functionalities to clients of the distributed computing systems. In operation, components within a distributed computing system may experience failures. Such failures may be caused by various conditions, such as excessive network traffic, temporary increases in the workload, hardware/software failures, etc., and often need to be identified and resolved by a system administrator. However, because of the complexity of the distributed computing system, the system administrator may not be able to timely identify and resolve a failure.

One potential solution to this problem is to perform a time-series analysis of the failures occurring within the distributed computing system and compare the results of the time-series analysis against a static threshold. If the results of the time-series analysis indicate that the number of failures exceeds the static threshold, then the system administrator is alerted. The system administrator may then review the characteristics of the components within distributed computing system in order to resolve the failure.

One drawback with such an approach is that time-series analysis is generally compute intensive and complex. Consequently, the results of a time-series analysis may not be available until ten or fifteen minutes after the failure occurred. Subsequently, the system administrator may have to manually inspect different components that could be causing the failure, resulting in further delay. In the meantime, the failure may remain unresolved, resulting in further failures and, in extreme circumstances, a system outage that may negatively impact a significant number of clients of the distributed computing system. Another drawback with such an approach is that a time-series analysis does not sufficiently take into account the variable nature of the failure behavior of the distributed computing system over time.

As the foregoing illustrates, what is needed in the art are more effective techniques for detecting and analyzing failures in a distributed computing system.

SUMMARY

Various embodiments of the present application set forth a computer-implemented method for detecting anomalies across a plurality of components within a distributed computing system. The method includes retrieving event data associated with a stream of events generated by one or more components within a distributed computing system. The method further includes computing a failure metric based on the event data. The method further includes determining that the failure metric exceeds a dynamically adjustable trigger condition. The method further includes generating an alert associated with the failure metric.

Other embodiments include, without limitation, one or more computer-readable media including instructions for performing one or more aspects of the disclosed techniques, as well as a computing device for performing one or more aspects of the disclosed techniques.

At least one technical advantage of the disclosed techniques relative to the prior art is that anomalies are detected with less latency and with greater granularity relative to prior approaches. As a result, system administrators receive indications of alert conditions soon after the anomaly occurs. The system administrators can, therefore, resolve the anomaly that gave rise to the alert condition faster. In addition, the indication includes data that assists the system administrator to quickly identify which particular component of the computing system is at fault. Consequently, the system administrator may more easily identify the portion of the distributed computing system where repair efforts should be focused. These technical advantages represent one or more technological improvements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 illustrates a timeline of events included in an alert generated by the anomaly detection system of FIG. 1, according to various embodiments of the present disclosure;

FIG. 6A illustrates an example graph of a parameter for determining whether a metric is recovering from an anomaly, according to various embodiments of the present disclosure;

DETAILED DESCRIPTION

Figure 1:
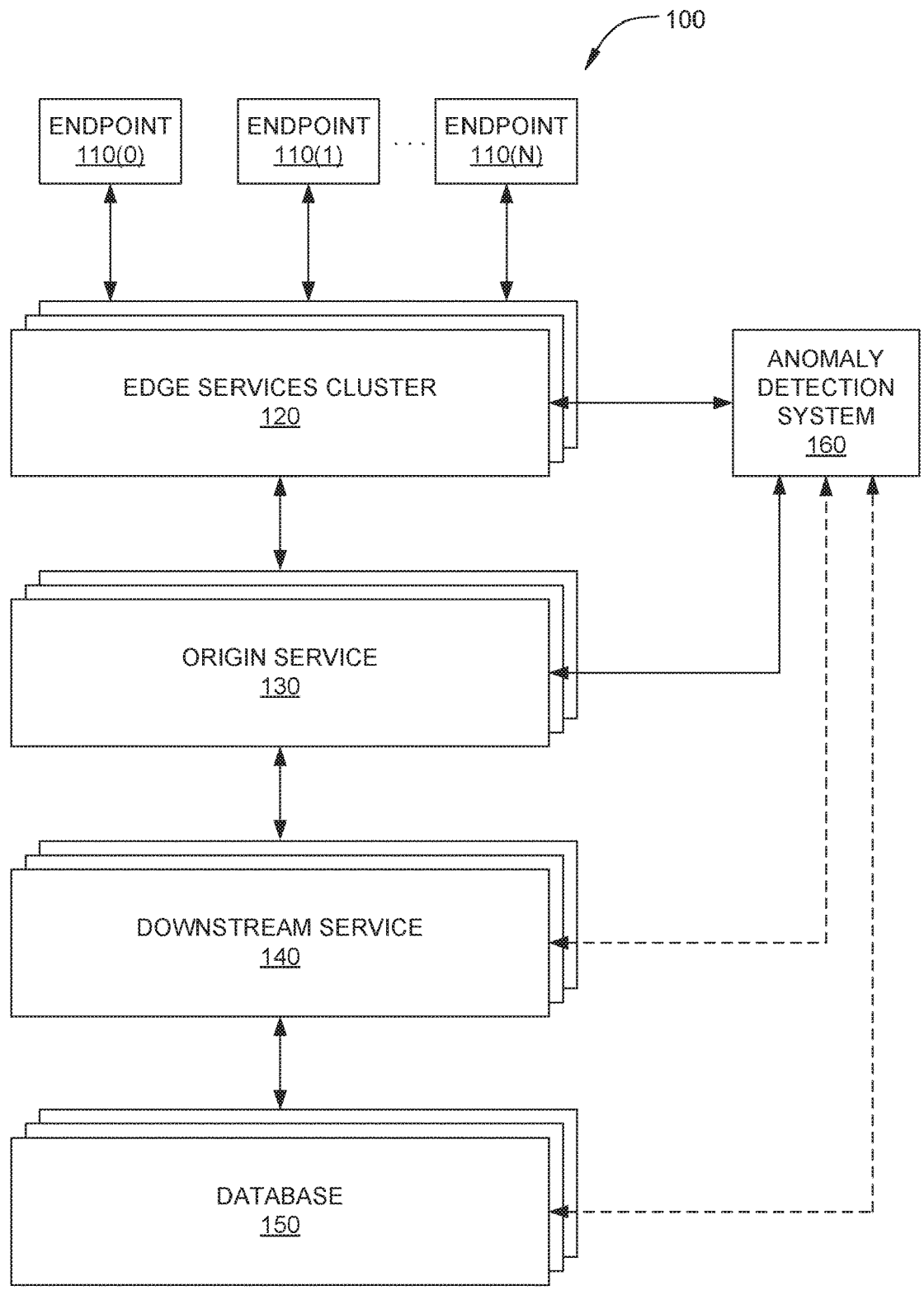
FIG. 1 illustrates a distributed computing system configured to implement one or more aspects of the present disclosure.

In the following description, numerous specific details are set forth to provide a more thorough understanding of the embodiments of the present disclosure. However, it will be apparent to one of skill in the art that the embodiments of the present disclosure may be practiced without one or more of these specific details.

The quality of a distributed computing system configured to provide video streaming and/or other services is often measured by the ability of components within the distributed computing system to operate reliably. Therefore, being able to quickly identify and resolve failures within the distributed computing system is an important factor in the ability of the distributed computing system to provide consistent and high-quality service.

Prior art techniques for identifying failures are prohibitively computationally intensive and time consuming. For example, some prior art techniques involve performing a time-series analysis on requests received by the distributed computing system in order to identify how many requests were successful and how many requests failed. Some number of failures may be short term and occasional and, therefore, tolerable. However, a number of failures that exceeds a threshold amount may indicate a more serious failure that requires the involvement of a system administrator.

With time-series analyses, the system administrator oftentimes receives only an alert that a failure has occurred, without knowing which component(s) of the distributed computing system have failed, leading to further investigation and delay. The time-series analysis may thus require more than ten to fifteen minutes to complete and may not result in the identification of the particular component(s) that have failed. In the meantime, clients of the distributed computing system may experience significant delays or, in more extreme cases, system outages.

In various embodiments, an anomaly detection system monitors events related to requests processed within a distributed computing system in real-time and on an ongoing basis. The anomaly detection system groups the events based on the component or combinations of components involved in processing the corresponding requests. For each grouping, the anomaly detection system computes a failure count once per second, where the failure count reflects the number of failures experienced by the component or combination of components associated with the grouping.

For a given grouping, if the number of failures exceeds a dynamically adjusted threshold, then the anomaly detection system determines that a suspected anomaly is present. In response, the anomaly detection system continues to monitor the number of failures for that grouping over a period of time. If the number of failures continues to be above the dynamically adjusted threshold, then the anomaly detection system determines that a confirmed anomaly is present. Upon confirming that an anomaly is present, the anomaly detection system generates an alert message that identifies which component(s) within the distributed computing system are experiencing the alert condition, along with other identifying information.

In addition, as the average number of failures increases or decreases over time, the dynamically adjusted threshold likewise increases or decreases, respectively. Further, as the anomaly detection system continues to monitor the range of failure counts over time, the anomaly detection system compares the current range of failure counts to the range of failure counts occurring prior to the alert condition. When the current range of failure counts is substantially the same as the range of failure counts occurring prior to the alert condition, the anomaly detection system determines that the distributed computing system has recovered from the alert condition.

Advantageously, the process of identifying alert conditions occurs in real-time as requests are serviced by the distributed computing system. Consequently, the anomaly detection system identifies anomalies and generates alerts with reduced latency relative to prior art techniques. In addition, the anomaly detection system identifies the component(s) within the distributed computing system that are experiencing the alert condition and surfaces this information to a system administrator. A system administrator, therefore, is able to quickly identify the likely source of the alert condition. Further, because separate thresholds are maintained and adjusted for each group of components, the anomaly detection system adapts to changes in failure behavior as they evolve. As a result, the number of false positives and false negatives may be reduced relative to prior art techniques.

Detecting and Analyzing Failures in a Distributed Computing System

FIG. 1 illustrates a distributed computing system 100 configured to implement one or more aspects of the present disclosure. As shown, the distributed computing system 100 includes, without limitation, endpoints 110(0)-110(N), edge services clusters 120 (referred to individually as an "edge services cluster 120"), origin services 130 (referred to individually as an "origin service 130"), downstream services 140 (referred to individually as a "downstream service 140"), databases 150 (referred to individually as a "database 150"), and an anomaly detection system 160.

The endpoints 110(0)-110(N), edge services clusters 120, origin services 130, downstream services 140, databases 150, and anomaly detection system 160 communicate with each other via any technically feasible combination of point-to-point connections and one or more communications networks. Such networks may include any suitable environment to enable communications among remote or local computer systems and computing devices, including, without limitation, wireless and wired LANs and internet-based WANs (Wide Area Networks).

In various embodiments, the origin services 130, downstream services 140, and databases 150 collectively operate to expose specific functionalities to the endpoints 110. In operation, an endpoint 110 issues requests in order to interact with one or more services implemented in the distributed computing system 100. In response to a request, one or more origin services 130 and/or one or more downstream services 140 in the distributed computing system 100 execute software to perform operations related to processing the request and, subsequently, issue responses to the requests. The operations related to processing a request may involve accessing data stored within the databases 150, issuing requests to additional services internal or external to the distributed computing system 100, and/or performing computational operations on inputs provided in conjunction with the request. For example, suppose that the distributed computing system 100 implements content distribution functionality. In such an example, an endpoint 110 could transmit a request to an origin service 130 for content recommendations associated with a current client session. The origin service 130, in turn, generates requests directed towards one or more downstream services 140. The downstream services 140 may perform one or more computational operations and/or access data from one or more databases 150 in order to generate content recommendations associated with the current client session. The downstream services 140 return the content recommendations to the requesting origin service 130, which transmits the recommendations to the requesting endpoint 110.

In various embodiments, the edge services clusters 120 operate as a gateway between the endpoints 110 and the origin services 130, as well as the downstream services 140. In various embodiments, the edge services clusters 120 routes, monitors, and provides security for requests received from the endpoints 110. In operation, an edge services cluster 120 routes requests received from the endpoints 110 to an origin service 130 corresponding to the request. The edge services cluster 120 determines an origin service 130 corresponding to a given request based on the type of the request, a type of the endpoint 110 that transmitted the request, and/or any other configurable criteria. In various embodiments, the edge services cluster 120 receives a request from an endpoint 110 either directly or via an intermediate load balancing service (not shown).

Different components within the distributed computing system 100, such as the edge services clusters 120 and the origin services 130, transmit events to the anomaly detection system 160. In various embodiments, the events are transmitted to the anomaly detection system 160 as a real-time stream of events. Each event includes a status message associated with the processing of a corresponding request received from an endpoint 110. The status message indicates whether a task related to the corresponding request was completed successfully or resulted in a failure. If the task resulted in a failure, then the status message may include further information, such as the type of failure and a timestamp associated with the failure. Depending on how a given request is processed, the anomaly detection system 160 may receive several events associated with the processing of a single request. For example, different tasks associated with a given request may be executed by different downstream services 140, and the anomaly detection system 160 may receive a different event associated with the execution of each of the tasks from the downstream services 140. Further, different portions of the databases 150 may be accessed by the different downstream services 140. The anomaly detection system 160 may receive a different event associated with the access of the databases 150 from the databases 150.

The anomaly detection system 160 groups the events received from different components of the distributed computing system 100 based on the component or combination of components involved in processing the corresponding requests. More specifically, the anomaly detection system 160 groups the events corresponding to a given request by the edge services cluster 130 that routed the request, by the origin 130 to which the request was routed, by the downstream service 140 that executed a task related to the request, and by any combination of components, such as cluster-origin, origin-downstream service, etc. For example, in a distributed computing system 100 with N edge services clusters 120 and M origin services 130, the anomaly detection system 160 could group the received events into N cluster groupings, M origin groupings, and N×M cluster-origin groupings.

For each grouping, the anomaly detection system 160 stores the events in the grouping in an event store (not shown). The anomaly detection system 160 aggregates the events for each grouping over a rolling window of time and generates one or more metrics corresponding to the rolling window of time. In various embodiments, the anomaly detection system 160 generates the metrics periodically or with a pre-determined frequency.

The metrics corresponding to a given rolling window of time summarize the status messages represented by the events for the given grouping. For example, the metrics could include a count of the successful requests and the failed requests for the grouping during the rolling window of time. In some embodiments, the anomaly detection system 160 may generate metrics at a finer granularity. For example, the anomaly detection system 160 could report, without limitation, the number of failures resulting from connectivity issues, the number of failures resulting from timeouts, and the number of failures resulting from throttling retries.

The anomaly detection system 160 maintains separate dynamically adjustable trigger conditions corresponding to each grouping and failure metric combination. For a given grouping and failure metric combination, the dynamically adjustable trigger condition specifies a threshold between a normal operating condition and an anomaly condition. The dynamically adjustable trigger condition adjusts over time based on the stream of values for the corresponding grouping and failure metric combination. If the anomaly detection system 160 detects that a failure metric for a given grouping exceeds the corresponding dynamically adjustable trigger condition, then the anomaly detection system 160 determines that a suspected anomaly is present. If the failure metric continues to exceed the corresponding dynamically adjustable trigger condition for a period of time, such as 30 seconds or 60 seconds, then the anomaly detection system 160 determines that the suspected anomaly is a confirmed anomaly. The anomaly detection system 160 continues to gather additional information regarding the anomaly to determine the particular components, such as the cluster, origin, or cluster-origin combination, that is the likely root cause of the anomaly. Based on the determination of the likely root cause of the anomaly, the anomaly detection system 160 transmits an alert, such as an email, a page message, or an automated phone call, to one or more system administrators who are identified as being responsible for the components that are the likely root cause of the anomaly. The alert may include data regarding the detected anomalies occurring within a given time window, including a timeline representing the failure metrics of the relevant groupings. In some embodiments, the anomaly detection system 160 may update a dashboard to indicate that an alert condition is present.

Once an anomaly related to a given grouping and failure metric combination is confirmed, the anomaly detection system 160 monitors events associated with the grouping to determine whether the distributed computing system 100 has recovered from the previously detected anomaly. If the distributed computing system 100 has recovered from the previously detected anomaly, then the anomaly detection system 160 determines that the anomaly is no longer present. In some embodiments, the anomaly detection system 160 may update a dashboard to indicate that the alert condition is no longer present.

Although only a single anomaly detection system 160 is shown in FIG. 1, in various embodiments, multiple anomaly detection system 160 may be implemented to detect and report anomalies occurring within the distributed computing system 100. The anomaly detection system 160 is described in further detail below in conjunction with FIG. 2.

Figure 2:
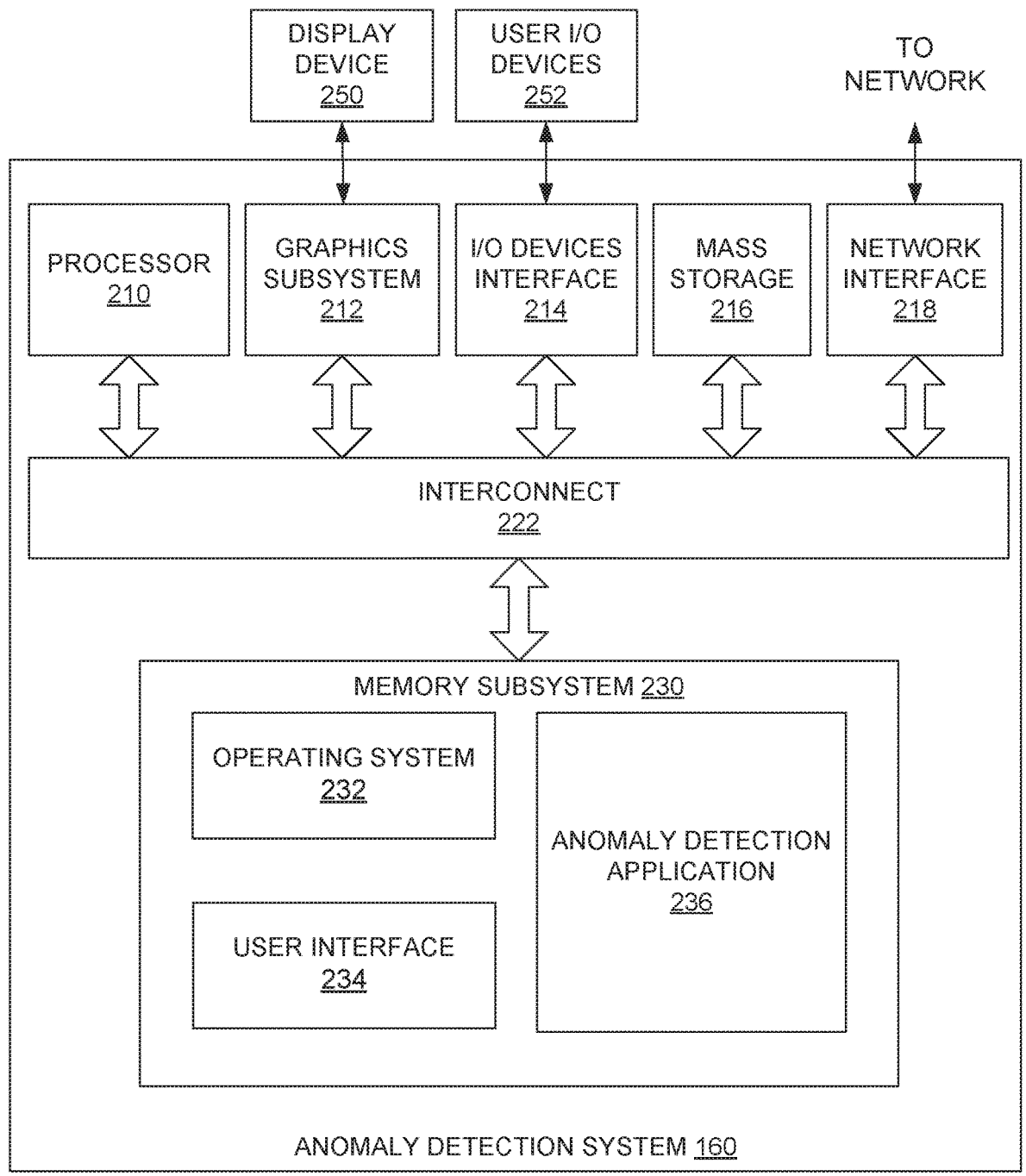
FIG. 2 is a block diagram of an anomaly detection system that may be implemented in conjunction with the distributed computing system of FIG. 1, according to various embodiments of the present disclosure.

FIG. 2 is a block diagram of an anomaly detection system 160 that may be implemented in conjunction with the distributed computing system 100 of FIG. 1, according to various embodiments of the present disclosure. As shown, the anomaly detection system 160 may include, without limitation, a processor 210, a graphics subsystem 212, an I/O device interface 214, a mass storage unit 216, a network interface 218, an interconnect 222, and a memory subsystem 230.

The processor 210 is included to be representative of a single CPU, multiple CPUs, a single CPU having multiple processing cores, and the like. In some embodiments, the processor 210 is configured to retrieve and execute programming instructions stored in the memory subsystem 230. Similarly, the processor 210 is configured to store and retrieve application data (e.g., software libraries) residing in the memory subsystem 230. The interconnect 222 is configured to facilitate transmission of data, such as programming instructions and application data, between the processor 210, the graphics subsystem 212, the I/O devices interface 214, the mass storage 216, the network interface 218, and the memory subsystem 230.

In some embodiments, the graphics subsystem 212 is configured to generate frames of video data and transmit the frames of video data to display device 250. In some embodiments, the graphics subsystem 212 may be integrated into an integrated circuit, along with the processor 210. The display device 250 may comprise any technically feasible means for generating an image for display. For example, the display device 250 may be fabricated using liquid crystal display (LCD) technology, cathode-ray technology, and light-emitting diode (LED) display technology. An input/output (I/O) devices interface 214 is configured to receive input data from the user I/O devices 252 and transmit the input data to the processor 210 via the interconnect 222. For example, the user I/O devices 252 may comprise one or more buttons, a keyboard, and a mouse or other pointing device. The I/O device interface 214 also includes an audio output unit configured to generate an electrical audio output signal. The user I/O devices 252 include a speaker configured to generate an acoustic output in response to the electrical audio output signal. In alternative embodiments, the display device 250 may include the speaker.

A mass storage unit 216, such as a hard disk drive or flash memory storage drive, is configured to store non-volatile data. A network interface 218 is configured to transmit and receive packets of data via one or more networks. In some embodiments, the network interface 218 is configured to communicate using the well-known Ethernet standard. The network interface 218 is coupled to the processor 210 via the interconnect 222.

In some embodiments, the memory subsystem 230 includes programming instructions and application data that comprise an operating system 232, a user interface 234, and an anomaly detection application 236. The operating system 232 performs system management functions such as managing hardware devices including the network interface 218, the mass storage unit 216, the I/O devices interface 214, and the graphics subsystem 212. The operating system 232 also provides process and memory management models for the user interface 234 and the anomaly detection application 236. The user interface 234, such as a window and object metaphor, provides a mechanism for user interaction with the anomaly detection system 160. Persons skilled in the art will recognize the various operating systems and user interfaces that are well-known in the art and suitable for incorporation into the anomaly detection system 160.

In operation, the anomaly detection application 236 receives a real-time stream of events from components within the distributed computing system 100, such as the edge services clusters 120, the origin services 130, the downstream services 140, and the databases 150. Each event indicates whether a corresponding request received from an endpoint 110 server completed successfully or resulted in a failure. If the request failed, then the event further includes the type of failure and other relevant information. The anomaly detection application 236 groups the events received from different components of the distributed computing system 100 based on the component or combination of components involved in processing the corresponding requests. More specifically, the anomaly detection application 236 groups the events corresponding to a given request by the edge services cluster 130 that routed the request, by the origin 130 to which the request was routed, by the downstream service 140 that executed a task related to the request, and by any combination of components, such as cluster-origin, origin-downstream service, etc. For example, in a distributed computing system 100 with N edge services clusters 120 and M origin services 130, the anomaly detection application 236 could group the received events into N cluster groupings, M origin groupings, and N×M cluster-origin groupings.

For each grouping, the anomaly detection application 236 stores the events in the grouping in an event store. The anomaly detection application 236 processing the events for each grouping to generate performance metrics associated with the grouping. In operation, the anomaly detection application 236 aggregates the events for each grouping over a rolling window of time and generates one or more metrics corresponding to the rolling window of time. In various embodiments, the anomaly detection application 236 generates the metrics periodically or with a pre-determined frequency.

In this manner, the anomaly detection application 236 may maintain a separate event store for each grouping. For each grouping, the anomaly detection application 236 analyzes the events included in the corresponding event store in three phases, namely, aggregation, anomaly detection, and reporting. These three phases may execute within the context of the anomaly detection application 236. Additionally or alternatively, the three phases may execute as three separate sub-processes associated with the anomaly detection application 236.

In the aggregation phase, the anomaly detection application 236 aggregates the events for each grouping over a rolling window of time. On an ongoing basis, the anomaly detection application 236 generates one or more metrics corresponding to the rolling window of time. The metrics corresponding to a given rolling window of time summarize the status messages represented by the events for the given grouping. For example, the metrics could include a count of the successful requests and the failed requests for the grouping during the rolling window of time. In some embodiments, the anomaly detection application 236 may generate metrics at a finer granularity. For example, the anomaly detection application 236 could report, without limitation, the number of failures resulting from connectivity issues, the number of failures resulting from timeouts, and the number of failures resulting from throttling retries.

In one particular example, the rolling window could be ten seconds and the metric generation period could be one second. In such an example, the anomaly detection application 236 would store events in the event stores representing the most recent ten second window of time. The anomaly detection application 236 would generate a set of metrics, such as success counts and failure counts, once per second for each grouping. The set of metrics would represent the value for those metrics over the most recent ten seconds. After generating the set of metrics, the anomaly detection application 236 would delete the events from the event stores that are associated with the oldest second included in the rolling window of time. The anomaly detection application 236 would then store events in the event stores for the current second of time. After one second, the anomaly detection application 236 would again generate a set of metrics, such as success counts and failure counts, for the new ten-second rolling window of time.

In the anomaly detection phase, the anomaly detection application 236 monitors each metric for each grouping over time. Each metric that is monitored over time may be referred to as a timeline, where a timeline may be converted to a graph and transmitted to one or more system administrators as part of an alert. Therefore, the anomaly detection application 236 may generate a success timeline, a connectivity failure timeline, a timeout failure timeline, a throttling retry failure timeline, and other timelines for each grouping. Each timeline may represent a rolling window of time. For example, the rolling window of time could be thirty minutes. In such an example, each timeline would represent the value of a particular metric for a particular grouping over the most recent thirty minutes of time.

The anomaly detection application 236 also maintains a different dynamically adjustable trigger condition for each timeline, corresponding to each grouping and failure metric combination. For a given grouping and failure metric combination, the dynamically adjustable trigger condition specifies a threshold between a normal operating condition and an anomaly condition. The dynamically adjustable trigger condition adjusts over time based on the stream of events associated with the corresponding grouping and failure metric combination.

If a particular timeline does not yet have a defined dynamically adjustable trigger condition, then the anomaly detection application 236 initializes the dynamically adjustable trigger condition. In one example, the anomaly detection application 236 could determine the median value of the metric over a period of time, such as five minutes. The anomaly detection application 236 could then initialize the dynamically adjustable trigger condition to the median times some factor, such as two. As a result, the anomaly detection application 236 would initialize the dynamically adjustable trigger condition to two times the median of the metric over a five minute period.

Once the dynamically adjustable trigger condition has been initialized, the anomaly detection application 236 dynamically adjusts the dynamically adjustable trigger condition each time a new value for the metric is received. If the new value for the metric is greater than the current median for that metric, then the anomaly detection application 236 increases the median by some value, such as one. If the new value for the metric is less than the current median for that metric, then the anomaly detection application 236 decreases the median by some value, such as one. If the new value for the metric is the same as the current median for that metric, then the median remains unchanged. After adjusting the median based on the new value of the metric, the anomaly detection application 236 sets the new value of the dynamically adjustable trigger condition to the adjusted median multiplied by a factor, such as two.

The anomaly detection application 236 then compares the new value of the metric to the new dynamically adjustable trigger condition. If the new value of the metric is greater than the new dynamically adjustable trigger condition, then the anomaly detection application 236 determines that a suspected anomaly is present. In some embodiments, the anomaly detection application 236 may update a dashboard to indicate that an alert condition is present. If, on the other hand, the new value of the metric is less than or equal to the new dynamically adjustable trigger condition, then the anomaly detection application 236 determines that a suspected anomaly is not present. If a metric for a particular grouping indicates that a suspected anomaly is present, then the anomaly detection application 236 proceeds to the reporting phase.

In the reporting phase, the anomaly detection application 236 continues to monitor metrics that indicate suspected anomalies over a probationary period, such as 30-60 seconds, to determine whether an actual anomaly is occurring. If the metric falls below and stays below the dynamically adjustable trigger condition within the probationary period, then the anomaly detection application 236 determines that the anomaly is a transient condition. In general, a transient condition occurs when a metric briefly surges above the corresponding dynamically adjustable trigger condition, but then the metric falls below the dynamically adjustable trigger condition within a relatively short period of time. In such cases, the anomaly detection application 236 determines that the anomaly is no longer present. In some embodiments, the anomaly detection application 236 may update a dashboard to indicate that an alert condition is no longer present. If, on the other hand, the metric continues to exceed the corresponding dynamically adjustable trigger condition throughout the probationary period, then the anomaly detection application 236 determines that the suspected anomaly is a confirmed anomaly.

When a confirmed anomaly is detected, the anomaly detection application 236 continues to collect additional information related to the confirmed anomaly. The anomaly detection application 236 aggregates data associated with the confirmed anomaly and generates a human-readable alert. The alert may include the data related to the confirmed anomaly, including a timeline representing the failure metrics of the relevant groupings. In various embodiments, the alert may be in the form of charts, a list of timeline events, and so on. In some embodiments, the anomaly detection system 160 may update a dashboard to indicate that a confirmed alert condition is present.

Further, the anomaly detection application 236 analyzes the data associated with the confirmed anomaly in order to determine one or more components in the distributed computing system 100, such as clusters, origins, or cluster-origin combinations, that are the likely root cause of the confirmed anomaly. In one example, the anomaly detection application 236 could determine that the likely root cause of the anomaly is the cluster and/or origin identified in the event within the timeline of events of the alert that has the earliest timestamp. In another example, the anomaly detection application 236 could determine that the likely root cause of the anomaly is the cluster and/or origin that appear most often in the timeline of events of the alert. In yet another example, the anomaly detection application 236 could determine that the likely root cause of the anomaly is any one or more components that appear anywhere in the timeline of events of the alert. The anomaly detection application 236 then transmits, to one or more system administrators, an identification of the components that the anomaly detection application 236 has identified as the likely root causes of the anomaly. The alert may be in the form of an email, a page message, or an automated phone call.

Once an anomaly related to a given grouping and failure metric combination is confirmed, the anomaly detection application 236 monitors events associated with the grouping to determine whether the distributed computing system 100 has recovered from the previously detected anomaly. If the distributed computing system 100 has recovered from the previously detected anomaly, then the anomaly detection application 236 determines that the anomaly is no longer present. In some embodiments, the anomaly detection application 236 may update a dashboard to indicate that the alert condition is no longer present.

Figure 3:
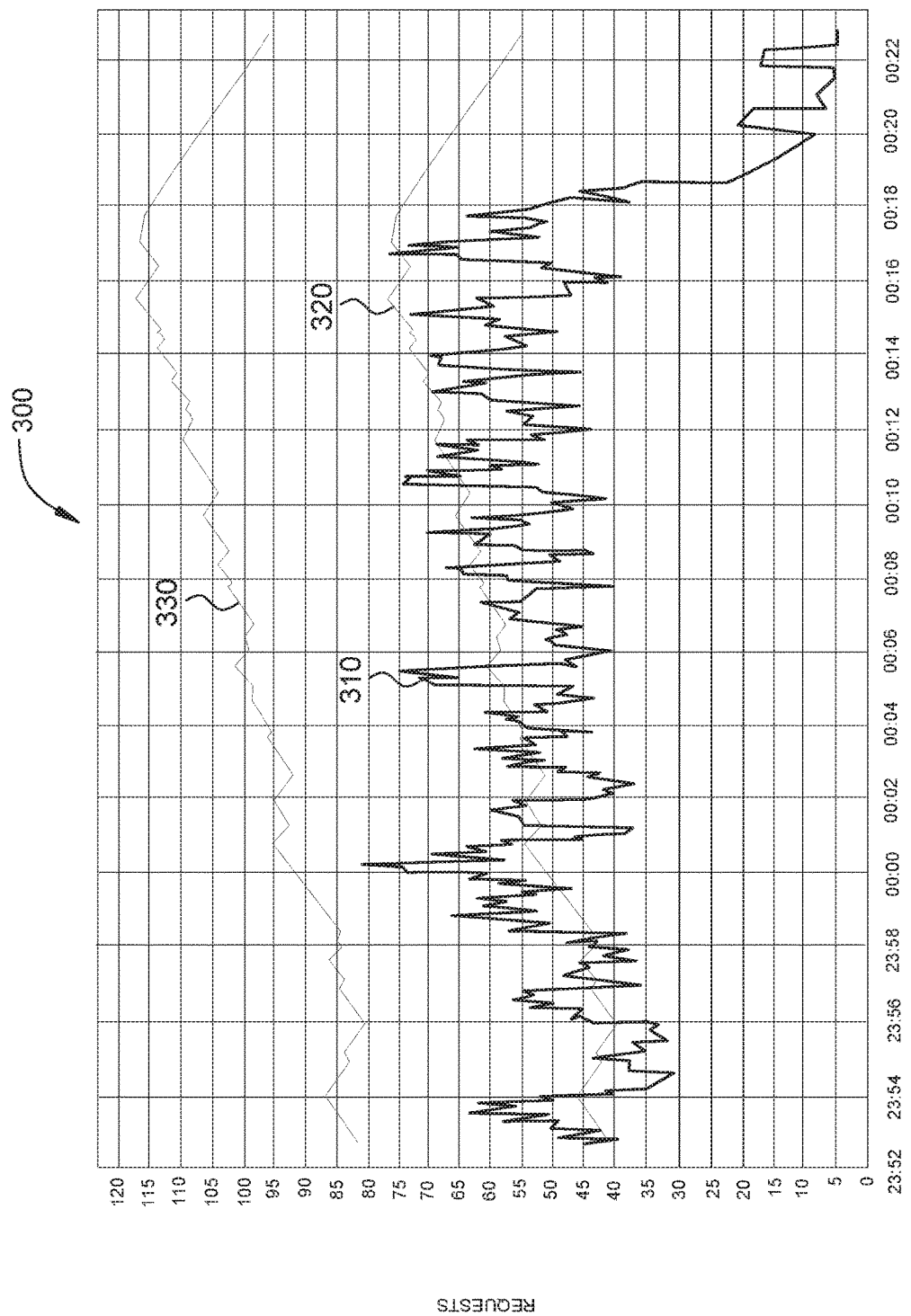
FIG. 3 illustrates a graph of a metric associated with a grouping, according to various embodiments of the present disclosure.

FIG. 3 illustrates a graph 300 of a metric associated with a grouping, according to various embodiments of the present disclosure. As shown, the graph 300 includes a metric timeline 310, a median timeline 320, and a dynamically adjustable trigger condition timeline 330. The graph 300 indicates that the metric timeline 310 stays below the dynamically adjustable trigger condition timeline 330 throughout the duration of time shown in the graph 300. Therefore, the anomaly detection application 236 does not detect an anomaly for the duration of time shown in the graph 300. Even though no anomaly is detected, the dynamically adjustable trigger condition gradually adjusts based on the value of the metric. When the current value of the metric is greater than the current median, as reflected on the median timeline 320, then the anomaly detection application 236 increases the median, and correspondingly increases the dynamically adjustable trigger condition. Correspondingly, when the current value of the metric is less than the current median, as reflected on the median timeline 320, then the anomaly detection application 236 decreases the median, and correspondingly decreases the dynamically adjustable trigger condition. These conditions are reflected in the graph 300 where, when the metric timeline 310 indicates an increase or decrease from one metric value to the next metric value, the median timeline 320 and the dynamically adjustable trigger condition timeline 330 respectively increases or decreases, albeit more gradually. In this manner, the dynamically adjustable trigger condition adapts to changes in the underlying metric over time.

Figure 4:
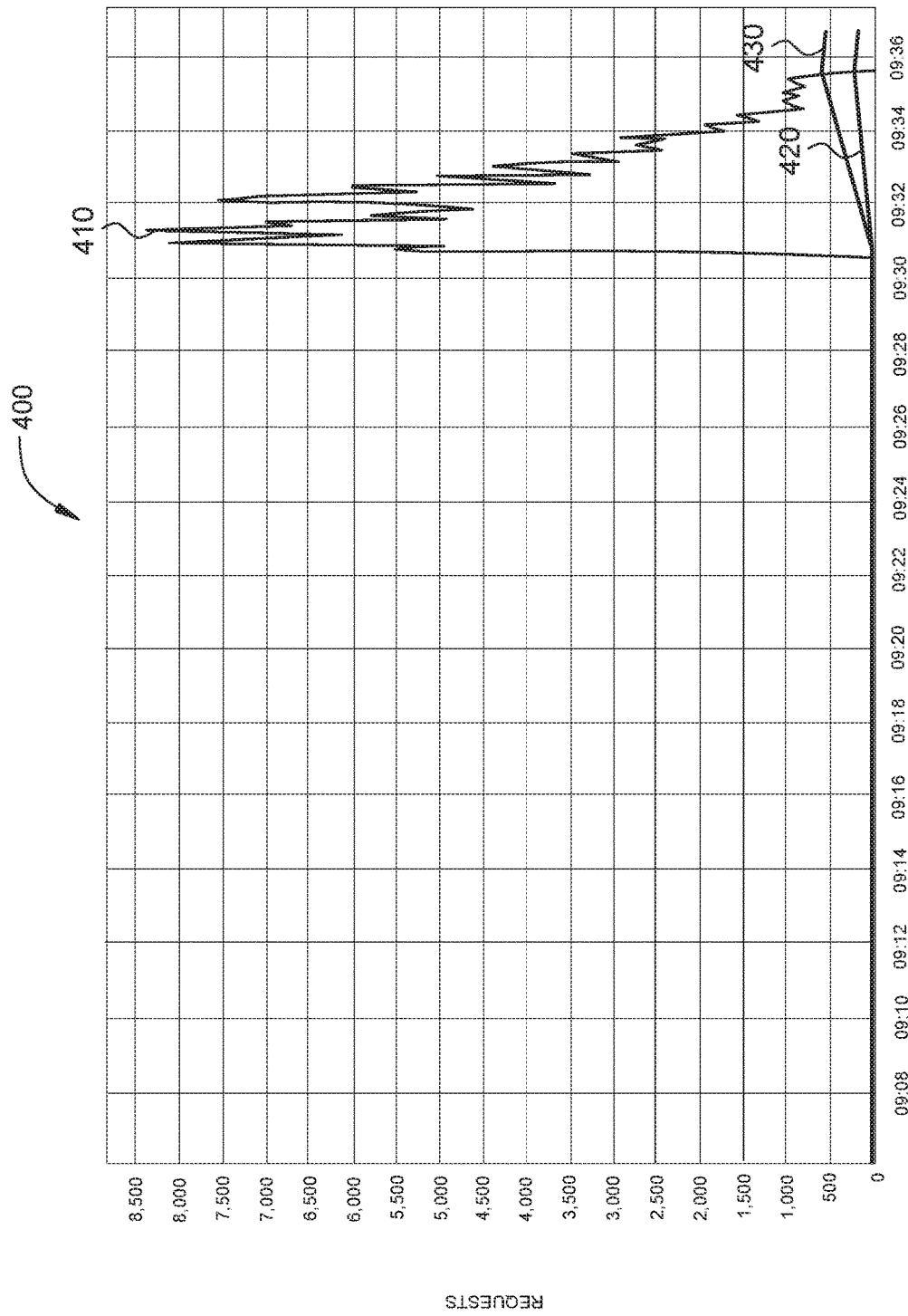
FIG. 4 illustrates another graph of a metric associated with a grouping, according to various embodiments of the present disclosure.

FIG. 4 illustrates another graph 400 of a metric associated with a grouping, according to various embodiments of the present disclosure. As shown, the graph 400 includes a metric timeline 410, a median timeline 420, and a dynamically adjustable trigger condition timeline 430. The graph 400 indicates that the metric timeline 410 stays below the dynamically adjustable trigger condition timeline 430 until approximately 9:30. At that point in time, the metric timeline 410 rapidly rises to a value that is much higher than the dynamically adjustable trigger condition timeline 430 until approximately 9:35.

Therefore, the anomaly detection application 236 detects an anomaly for the duration of time shown in the graph 400. In addition, the dynamically adjustable trigger condition gradually adjusts based on the value of the metric. When the current value of the metric is greater than the current median, as reflected on the median timeline 420, then the anomaly detection application 236 increases the median, and correspondingly increases the dynamically adjustable trigger condition. Correspondingly, when the current value of the metric is less than the current median, as reflected on the median timeline 420, then the anomaly detection application 236 decreases the median, and correspondingly decreases the dynamically adjustable trigger condition. These conditions are reflected in the graph 400 where, when the metric timeline 410 indicates an increase or decrease from one metric value to the next metric value, the median timeline 420 and the dynamically adjustable trigger condition timeline 430 respectively increases or decreases, albeit more gradually. In this manner, the dynamically adjustable trigger condition adapts to changes in the underlying metric over time.

FIG. 5 illustrates a timeline of events 500 included in an alert generated by the anomaly detection system 160 of FIG. 1, according to various embodiments of the present disclosure. As shown, the timeline of events 500 includes six events. At time 7:11:33 AM, the timeline of events 500 indicates that the Zuul-Website cluster began having connectivity issues with the API Service origin at a rate of 13.08%. At time 7:12:10, the timeline of events 500 indicates that the API Service origin began experiencing timeouts at a rate of 1.29%. At time 7:12:22, the timeline of events 500 indicates that the Zuul-Website cluster began experiencing timeouts at a rate of 1.78%. At time 7:14:50, the timeline of events 500 indicates that the API Service origin started throttling retries at a rate of 43.86%. At time 7:14:52, the timeline of events 500 indicates that the Zuul-API cluster in combination with the API Service origin started throttling retries at a rate of 63.12%. At time 7:14:52, the timeline of events 500 indicates that the Zuul-API cluster started throttling retries at a rate of 60.24%. As shown, anomalies associated with the API service origin tend to precede or be concurrent with anomalies associated with either the Zuul-Website cluster or the Zuul-API cluster. Consequently, the most likely root cause of the anomaly is the API service origin, followed by the Zuul-Website cluster, and then followed by the Zuul-API cluster. As the timeline of events 500 shows, the elapsed time from the first detected anomaly to the corresponding alert is approximately three minutes and indicates the top three likely root causes of the anomaly.

FIG. 6A illustrates an example graph 600 of a parameter for determining whether a metric is recovering from an anomaly, according to various embodiments of the present disclosure. As further described herein, after determining that an anomaly has occurred and generating an alert, the anomaly detection system 160 continues to monitor the range of the appropriate metric, such as failure count, over time. The anomaly detection system 160 thereby determines whether the distributed computing system 100 has recovered from the anomaly. In so doing, the anomaly detection system 160 compares the current range of the metric to the range of the metric occurring prior to the alert condition. When the current range of the metric is substantially the same as the range of the metric occurring prior to the alert condition, the anomaly detection system determines that the distributed computing system has recovered from the alert condition.

One approach for comparing the current range of the metric to the range of the metric occurring prior to the alert condition is via the Hoeffding bound. Because the values of the metric are received via a real-time stream of events, the entire data set for the metric is not available at any given time. As a result, the true mean of the metric cannot be directly calculated. However, the Hoeffding bound provides a mechanism to calculate an empirical mean for the distribution of samples of the metric that estimates the true mean. More specifically, the true mean of the distribution of samples of the metric is within the value of E of the empirical mean, where E is calculated according to Equation 1 below:

$$\varepsilon = \sqrt{r^2 \frac{\log \frac{1}{\delta}}{2n}} \quad \text{(Equation 1)}$$

where r is the range (maximum value minus minimum value) represented by the samples, n is the sample size, and δ is equal to 1 minus the certainty. By adjusting the value of δ, based on the behavior of the metric, one can increase or decrease the certainty of the estimation of the mean relative to the true mean.

As shown in FIG. 6A, the range of the distribution 610 of metric samples is initially at a high level, indicating an anomaly. Over time, the range of the distribution 610 of metric samples gradually decreases as the network infrastructure recovers from the anomaly. Three Hoeffding bound curves 620, 630, and 640 illustrate an estimation of the true mean of the distribution 610 at different levels of certainty. Hoeffding bound curve 620 corresponds to a value of 0.050 for δ. Consequently, Hoeffding bound curve 620 estimates the true mean of the distribution 610 with a certainty level of 1.000-0.050 or 95%. At this certainty level, Hoeffding bound curve 620 is relatively near to the distribution 610. As a result, estimating the true mean with Hoeffding bound curve 620 may be insufficiently lenient, in that a recovery may occur and yet not be detected.

Hoeffding bound curve 640 corresponds to a value of 0.001 for δ. Consequently, Hoeffding bound curve 640 estimates the true mean of the distribution 610 with a certainty level of 1.000-0.001 or 99.9%. At this certainty level, Hoeffding bound curve 640 is relatively far from the distribution 610. As a result, estimating the true mean with Hoeffding bound curve 620 may be overly lenient, in that a recovery may be detected even when a recovery has not yet occurred.

Hoeffding bound curve 630 corresponds to a value of 0.010 for δ. Consequently, Hoeffding bound curve 630 estimates the true mean of the distribution 610 with a certainty level of 1.000-0.010 or 99%. At this certainty level, Hoeffding bound curve 640 is farther away from the distribution 610 relative to Hoeffding bound curve 620 but nearer to the distribution 610 relative to Hoeffding bound curve 640. As a result, estimating the true mean with Hoeffding bound curve 630 represents a balance between not detecting a recovery that has actually occurred and detecting a recovery when no recovery has occurred.

By appropriately adjusting the value of δ, the Hoeffding bound provides a mechanism to estimate the current mean of the distribution 610 of metric samples. To apply the Hoeffding approach for a given metric associated with the real-time stream of events, the anomaly detection system 160 calculates the Hoeffding bound for a distribution of sample points of the metric that represents the pre-alert condition. Subsequently, after an anomaly has occurred, the anomaly detection system 160 calculates the mean of a current distribution of sample points of the metric over a particular duration of time, such as 30 seconds. When the mean of a current distribution of sample points of the metric is less than the Hoeffding bound calculated for the pre-alert distribution, then the anomaly detection system 160 determines that the distributed computing system 100 has recovered from the anomaly.

Figure 6B:
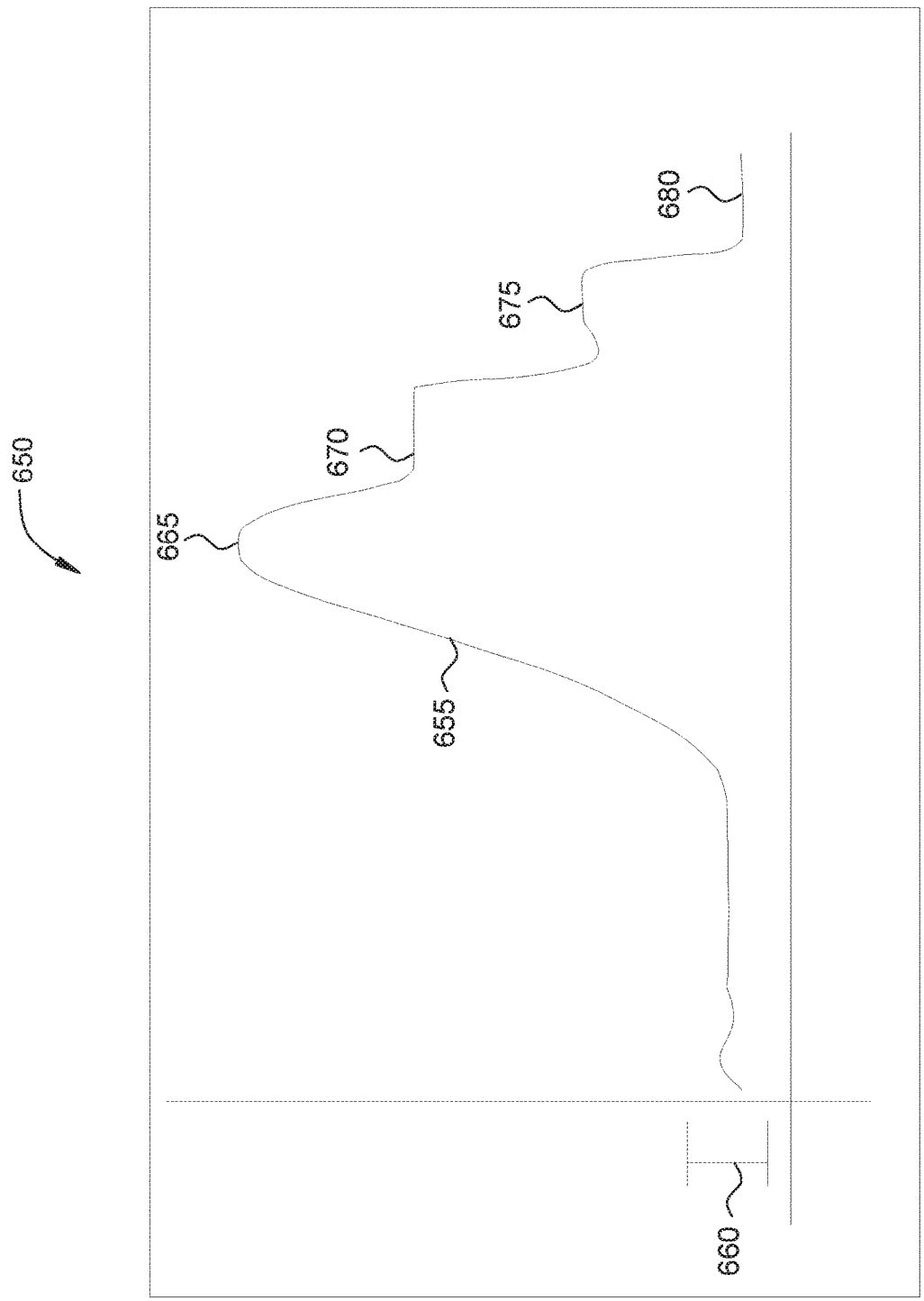
FIG. 6B illustrates an example graph of a metric that is recovering from an anomaly, according to various embodiments of the present disclosure.

FIG. 6B illustrates an example graph 650 of a metric that is recovering from an anomaly, according to various embodiments of the present disclosure. As shown, the graph 650 includes a metric timeline 655. During a time when the distributed computing system 100 is not experiencing an anomaly, the anomaly detection application 236 establishes a range of values for the metric when no anomaly is occurring, referred to herein as the pre-alert range 660. Subsequently, the metric timeline 655 indicates an increase in the metric until the metric reaches a peak value at point 665, thereby indicating an anomaly.

In order to detect when the metric has recovered and the anomaly has been alleviated, the anomaly detection application 236 continues to monitor the metric. Subsequently, the metric timeline 655 indicates that the metric has stabilized at a first level 670. The first level 670 represents a value for the metric that is below the peak value at point 665. However, the range of values corresponding to the first level 670 represents a value for the metric that is well above the pre-alert range 660. Therefore, the metric has not yet recovered to a range that existed prior to the anomaly. Consequently, determines that the distributed computing system 100 has not yet recovered from the anomaly.

Likewise, the metric timeline 655 indicates that the metric has further stabilized at a lower second level 675. The second level 675 represents a value for the metric that is below the peak value at point 665 and below the first level 670. However, the range of values corresponding to the second level 675 represents a value for the metric that is still well above the pre-alert range 660. Therefore, the metric has not yet recovered to a range that existed prior to the anomaly. Consequently, determines that the distributed computing system 100 has not yet recovered from the anomaly.

The metric timeline 655 indicates that the metric has further stabilized at a lower third level 680. The third level 680 represents a value for the metric that is below the peak value at point 665, below the first level 670, and below the second level 675. In addition, the range of values for the metric at the third level 680 is substantially the same as the range of values for the metric at the pre-alert range 660. Therefore, the metric has now recovered to a range that existed prior to the anomaly. Consequently, determines that the distributed computing system 100 has recovered from the anomaly.

Figure 7:
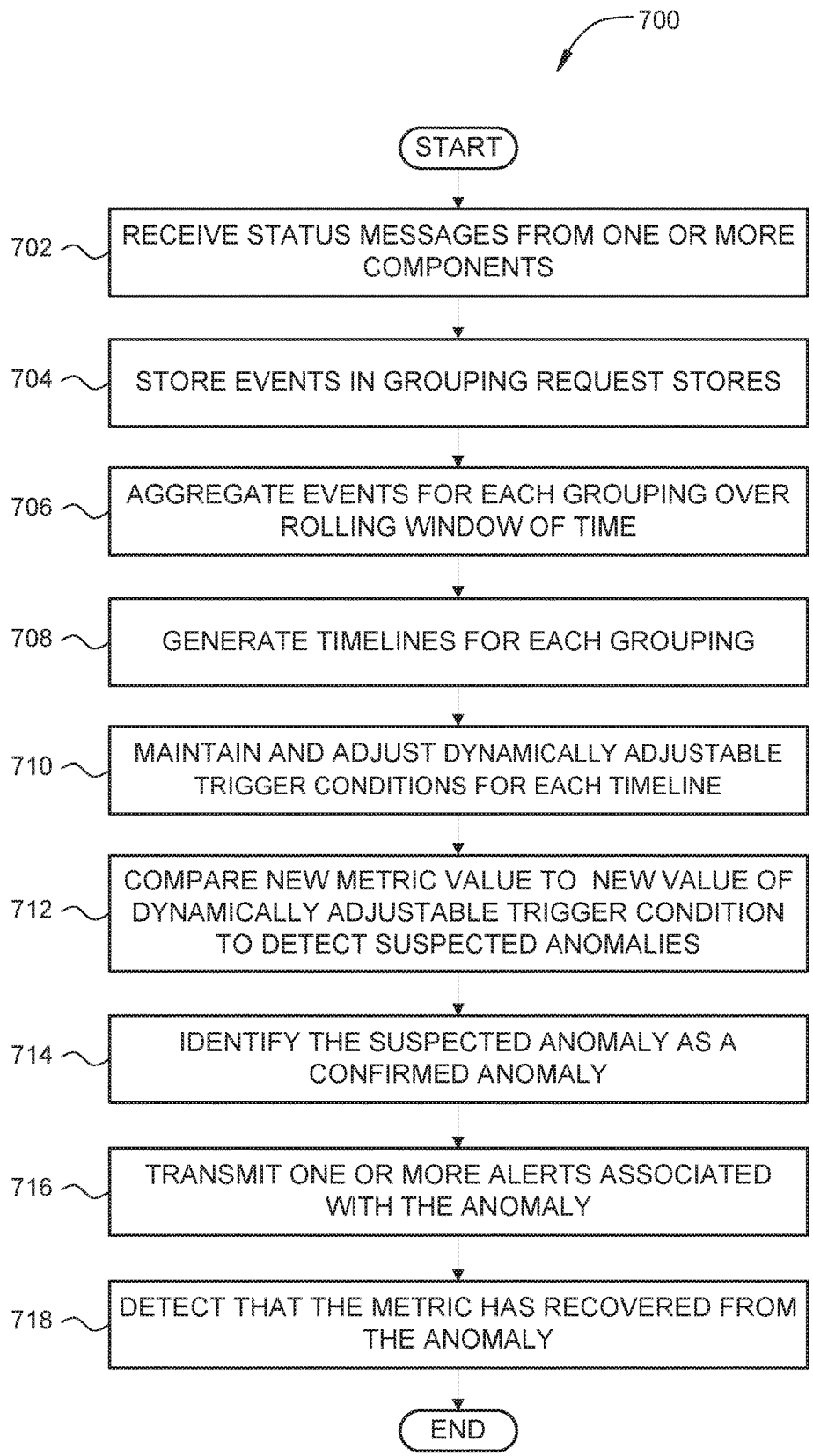
FIG. 7 is a flow diagram of method steps for detecting anomalies across a one or more components within a distributed computing system, according to various embodiments of the present disclosure.

FIG. 7 is a flow diagram of method steps for detecting anomalies across one or more components within a distributed computing system, according to various embodiments of the present disclosure. Although the method steps are described in conjunction with the systems of FIGS. 1-6B and 8-11, persons of ordinary skill in the art will understand that any system configured to perform the method steps, in any order, is within the scope of the present disclosure.

As shown, a method 700 begins at step 702, where an anomaly detection application 236 executing on an anomaly detection system 160 receives a real-time stream of events from components within the distributed computing system 100, such as the edge services clusters 120, the origin services 130, the downstream services 140, and the databases 150. Each event included in the real-time stream of events indicates whether a corresponding request received from an endpoint 110 completed successfully or resulted in a failure. If the request failed, the event further includes the type of failure and other relevant information. The anomaly detection application 236 groups the events received from different components of the distributed computing system 100 based on the component or combination of components involved in processing the corresponding requests. More specifically, the anomaly detection application 236 groups the events corresponding to a given request by the edge services cluster 130 that routed the request, by the origin 130 to which the request was routed, by the downstream service 140 that executed a task related to the request, and by any combination of components, such as cluster-origin, origin-downstream service, etc. For example, in a distributed computing system 100 with N edge services clusters 120 and M origin services 130, the anomaly detection application 236 could group the received events into N cluster groupings, M origin groupings, and N×M cluster-origin groupings.

At step 704, the anomaly detection application 236 stores the corresponding events in an event store. In various embodiments, the anomaly detection application 236 may maintain a separate event store for each grouping. For each grouping, the anomaly detection application 236 analyzes the events included in the corresponding event store in in order to perform aggregation, anomaly detection, and reporting functions.

At step 706, the anomaly detection application 236 aggregates the events for each grouping over a rolling window of time and generates one or more metrics corresponding to the rolling window of time. In various embodiments, the anomaly detection application 236 generates the metrics periodically or with a pre-determined frequency.

The metrics corresponding to a given rolling window of time summarize the status messages represented by the events for the given grouping. For example, the metrics could include a count of the successful requests and the failed requests for the grouping during the rolling window of time. In some embodiments, the anomaly detection system 160 may generate metrics at a finer granularity. For example, the anomaly detection system 160 could report, without limitation, the number of failures resulting from connectivity issues, the number of failures resulting from timeouts, and the number of failures resulting from throttling retries.

At step 708, the anomaly detection application 236 generates one or more timelines for each grouping, where each of the one or more timelines corresponds to a different metric for the corresponding grouping. Therefore, the anomaly detection application 236 may generate a success timeline, a connectivity failure timeline, a timeout failure timeline, a throttling retry failure timeline, and other timelines for each grouping. Each timeline may represent a rolling window of time. For example, the rolling window of time could be thirty minutes. In such an example, each timeline would represent the value of a particular metric for a particular grouping over the most recent thirty minutes of time.

At step 710, the anomaly detection application 236 separately maintains and adjusts a different dynamically adjustable trigger condition for each timeline. If a particular timeline does not yet have a defined dynamically adjustable trigger condition, then the anomaly detection application 236 initializes the dynamically adjustable trigger condition. In one example, the anomaly detection application 236 could determine the median value of the metric over a period of time, such as five minutes. The dynamically adjustable trigger condition could then initialize the dynamically adjustable trigger condition to the median times some factor, such as two. As a result, the anomaly detection application 236 would initialize the dynamically adjustable trigger condition to two times the median of the metric over a five minute period.

Once the dynamically adjustable trigger condition has been initialized, the anomaly detection application 236 dynamically adjusts the dynamically adjustable trigger condition each time a new value for the metric is received. If the new value for the metric is greater than the current median for that metric, then the anomaly detection application 236 increases the median by some value, such as one. If the new value for the metric is less than the current median for that metric, then the anomaly detection application 236 decreases the median by some value, such as one. If the new value for the metric is the same as the current median for that metric, then the median remains unchanged. After adjusting the median based on the new value of the metric, the anomaly detection application 236 sets the new value of the dynamically adjustable trigger condition to the adjusted median multiplied by a factor, such as two.

At step 712, the anomaly detection application 236 compares the new value of the metric to the new dynamically adjustable trigger condition. If the new value of the metric is greater than the new dynamically adjustable trigger condition, then the anomaly detection application 236 determines that a suspected anomaly is present. In some embodiments, the anomaly detection application 236 may update a dashboard to indicate that an alert condition is present. If, on the other hand, the new value of the metric is less than or equal to the new dynamically adjustable trigger condition, then the anomaly detection application 236 determines that a suspected anomaly is not present.

At step 714, the anomaly detection application 236 determines that the suspected anomaly is a confirmed anomaly. More particularly, upon detecting a suspected anomaly, the anomaly detection application 236 continues to monitor metrics that indicate suspected anomalies over a probationary period, such as 30-60 seconds, to determine whether an actual anomaly is occurring. If the metric falls below and stays below the dynamically adjustable trigger condition within the probationary period, then the anomaly detection application 236 determines that the anomaly is a transient condition. As a result, the anomaly detection application 236 determines that the anomaly is no longer present. In some embodiments, the anomaly detection application 236 may update a dashboard to indicate that the alert condition is no longer present. If, on the other hand, the metric continues to exceed the corresponding dynamically adjustable trigger condition throughout the probationary period, then the anomaly detection application 236 determines that the suspected anomaly is a confirmed anomaly. When a confirmed anomaly is detected, the anomaly detection application 236 continues to collect additional information regarding the confirmed anomaly. The anomaly detection application 236 aggregates data associated with the confirmed anomaly and generates a human-readable alert. The alert may include the data regarding the confirmed anomaly occurring including a timeline representing the failure metrics of the relevant groupings and may be in the form of charts, a list of timeline events, and so on.

At step 716, the anomaly detection application 236 transmits one or more alerts associated with the confirmed anomaly. In so doing, the anomaly detection application 236 analyzes the data associated with the anomaly in order to determine the particular components in the distributed computing system 100, such as clusters, origins, or cluster-origin combinations, that are the likely root cause of the confirmed anomaly. Based on the determination of the likely root cause of the anomaly, the anomaly detection application 236 transmits an alert, such as an email, a page message, or an automated phone call, to one or more system administrators who are identified as being responsible for the components that are the likely root cause of the anomaly. In some embodiments, the anomaly detection application 236 may update a dashboard to indicate that a confirmed alert condition is present. At step 718, the anomaly detection application 236 detects that the metric has recovered. Once an anomaly related to a given grouping and failure metric combination is confirmed, the anomaly detection application 236 monitors events associated with the grouping to determine whether the distributed computing system 100 has recovered from the previously detected anomaly. If the distributed computing system 100 has recovered from the previously detected anomaly, then the anomaly detection application 236 determines that the anomaly is no longer present. In some embodiments, the anomaly detection application 236 may update a dashboard to indicate that the alert condition is no longer present. The method 700 then terminates.

Content Streaming System Overview

Figure 8:
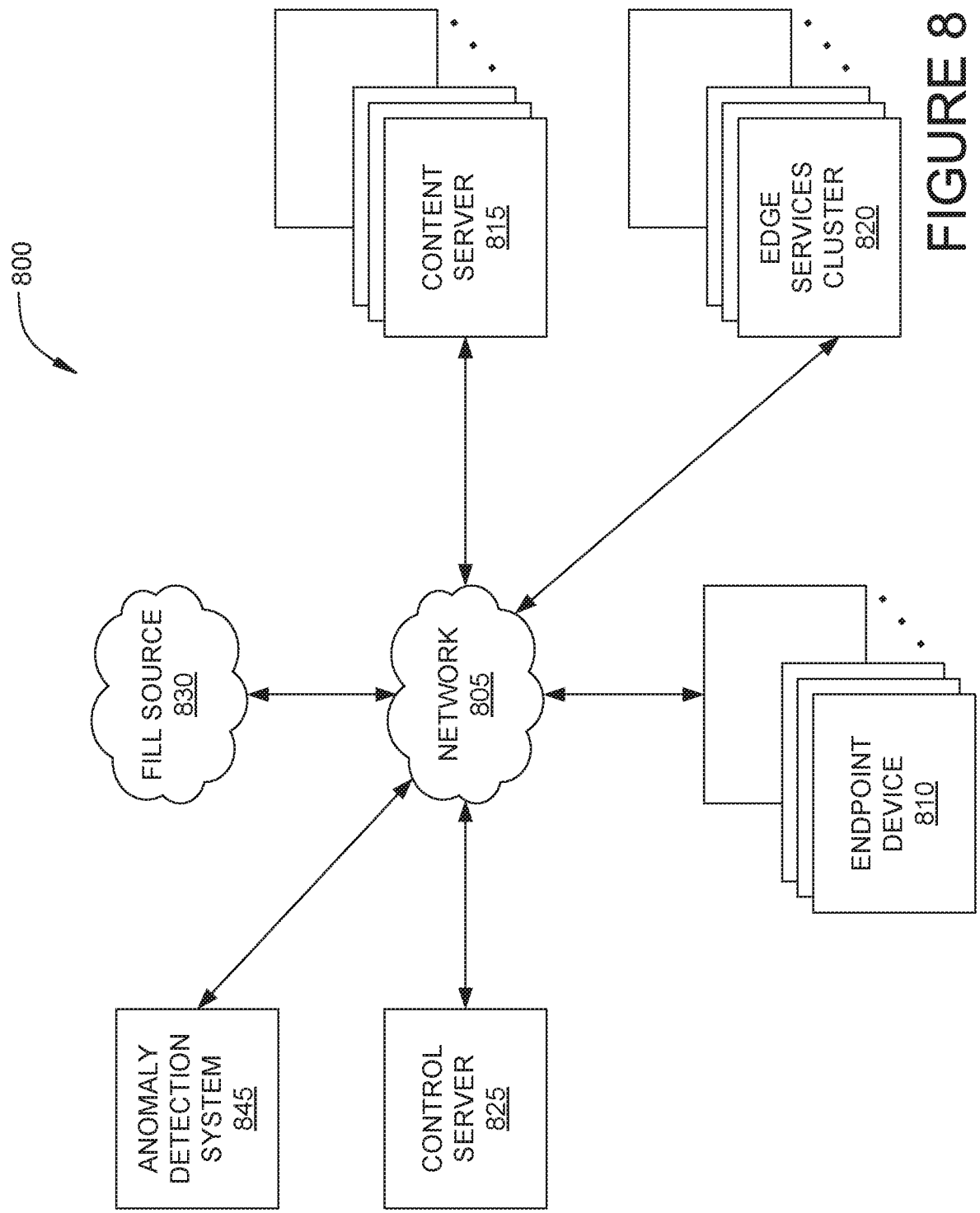
FIG. 8 illustrates a network infrastructure that may be used to implement the distributed computing system of FIG. 1, according to various embodiments of the disclosure.

FIG. 8 illustrates a network infrastructure 800 that may be used to implement the distributed computing system 100 of FIG. 1, according to various embodiments of the disclosure. As shown, the network infrastructure 800 includes, without limitation, endpoint devices 810, content servers 815, edge services clusters 820, a control server 825, and an anomaly detection system 845 that communicate with each other via a communications network 805. Network 805 may be any suitable environment to enable communications among remote or local computer systems and computing devices, including, without limitation, wireless and wired LANs and internet-based WANs (Wide Area Networks).

Each endpoint device 810 includes, without limitation, a computing device that may be a personal computer, video game console, personal digital assistant, mobile phone, mobile device, or any other device suitable for implementing one or more aspects of the present disclosure. Each endpoint device 810 communicates with one or more content servers 815 via edge services clusters 820 to download content, such as textual data, graphical data, audio data, video data, and other types of data. The content servers 815 are also referred to herein as "caches," "compute nodes," or, more simply, "nodes." The downloadable content, also referred to herein as a "file," is then presented to a user of one or more endpoint devices 810. In various embodiments, the endpoint devices 810 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 815 includes, without limitation, a storage device that may be a standalone networked attached storage (NAS) system, a storage area-network (SAN), a cluster or "farm" of storage devices, a distributed storage architecture, or any other device suitable for implementing one or more aspects of the present disclosure. Additionally or alternatively, each content server 815 may include, without limitation, a computing device with a storage subsystem that may be a standalone server, a cluster or "farm" of servers, one or more network appliances, or any other device suitable for implementing one or more aspects of the present disclosure. Each content server 815 may include, without limitation, a web-server and a database, and may be configured to communicate with the control server 825 to determine the location and availability of various files that are monitored and managed by the control server 825. Each content server 815 may further communicate with a fill source 830 and one or more other content servers 815 in order "fill" each content server 815 with copies of various files. In addition, the content servers 815 may respond to requests for files received from the endpoint devices 810. The files may then be distributed from the content server 815 or via a broader content distribution network. In some embodiments, the content servers 815 enable users to authenticate (e.g., using a username and password) in order to access files stored on the content servers 815.

In operation, the edge services clusters 820 act as a gateway to the control server 825 that implements the service. Among other things, the edge service cluster 820 receives requests from the endpoint devices 810 and routes the requests to the control server 825 that executes software that implements the service.

The control server 825 may include, without limitation, a computing device that may be a standalone server, a cluster or "farm" of servers, one or more network appliances, or any other device suitable for implementing one or more aspects of the present disclosure. Although only a single control server 825 is shown in FIG. 8, in various embodiments multiple control servers 825 may be implemented to monitor and manage files.

The anomaly detection system 845 may include, without limitation, a computing device that may be a standalone server, a cluster or "farm" of servers, one or more network appliances, or any other device suitable for implementing one or more aspects of the present disclosure. In various embodiments, the anomaly detection system 845 implements the same functionality as the anomaly detection system 160 described above.

In operation, the anomaly detection system 845 receives a real-time stream of events from components within the distributed computing system 100, such as the content servers 815, edge services clusters 820, and control server 825. In some embodiments, the events included in the real-time stream of events may be in the form of status messages. Each such status message indicates whether a corresponding request received from an endpoint device 810 completed successfully or resulted in a failure. If the request failed, the status message further includes the type of failure and other relevant information.

The anomaly detection system 845 groups the events received from different components of the network infrastructure 800 based on the component or combination of components involved in processing the corresponding requests. The anomaly detection system 845 aggregates the events for each grouping over a rolling window of time and generates one or more metrics corresponding to the rolling window of time. In various embodiments, the anomaly detection system 845 generates the metrics periodically or with a pre-determined frequency.

The metrics corresponding to a given rolling window of time summarize the status messages represented by the events for the given grouping. For example, the metrics could include a count of the successful requests and the failed requests for the grouping during the rolling window of time. In some embodiments, the anomaly detection system 845 may generate metrics at a finer granularity. For example, the anomaly detection system 845 could report, without limitation, the number of failures resulting from connectivity issues, the number of failures resulting from timeouts, and the number of failures resulting from throttling retries.

The anomaly detection system 845 maintains separate dynamically adjustable trigger conditions corresponding to each grouping and failure metric combination. For a given grouping and failure metric combination, the dynamically adjustable trigger condition specifies a threshold between a normal operating condition and an anomaly condition. The dynamically adjustable trigger condition adjusts over time based on the stream of values for the corresponding grouping and failure metric combination. If the anomaly detection system 845 detects that a failure metric for a given grouping exceeds the corresponding dynamically adjustable trigger condition, then the anomaly detection system 845 determines that a suspected anomaly is present. If the failure metric continues to exceed the corresponding dynamically adjustable trigger condition for a period of time, such as 30 seconds or 60 seconds, then the anomaly detection system 845 determines that the suspected anomaly is a confirmed anomaly. The anomaly detection system 845 continues to gather additional information regarding the anomaly to determine the particular components, such as the cluster, origin, or cluster-origin combination, that is the likely root cause of the anomaly. Based on the determination of the likely root cause of the anomaly, the anomaly detection system 845 transmits an alert, such as an email, a page message, or an automated phone call, to one or more system administrators who are identified as being responsible for the components that are the likely root cause of the anomaly. The alert may include data regarding the detected anomalies occurring within a given time window, including a timeline representing the failure metrics of the relevant groupings. In some embodiments, the anomaly detection system 845 may update a dashboard to indicate that an alert condition is present.

Once an anomaly related to a given grouping and failure metric combination is confirmed, the anomaly detection system 845 monitors events associated with the grouping to determine whether the network infrastructure 800 has recovered from the previously detected anomaly. If the network infrastructure 800 has recovered from the previously detected anomaly, then the anomaly detection system 845 determines that the anomaly is no longer present. In some embodiments, the anomaly detection system 845 may update a dashboard to indicate that the alert condition is no longer present.

Although only a single anomaly detection system 845 is shown in FIG. 8, in various embodiments multiple anomaly detection system 845 may be implemented to detect and report anomalies occurring within the network infrastructure 800.

In various embodiments, the fill source 830 may include an online storage service (e.g., Amazon® Simple Storage Service, Google® Cloud Storage, etc.) in which a catalog of files, including thousands or millions of files, is stored and accessed in order to fill the content servers 815. Although only a single fill source 830 is shown in FIG. 8, in various embodiments multiple fill sources 830 may be implemented to service requests for files. Further, as is well-understood, any cloud-based services can be included in the architecture of FIG. 8 beyond fill source 830 to the extent desired or necessary.

Figure 9:
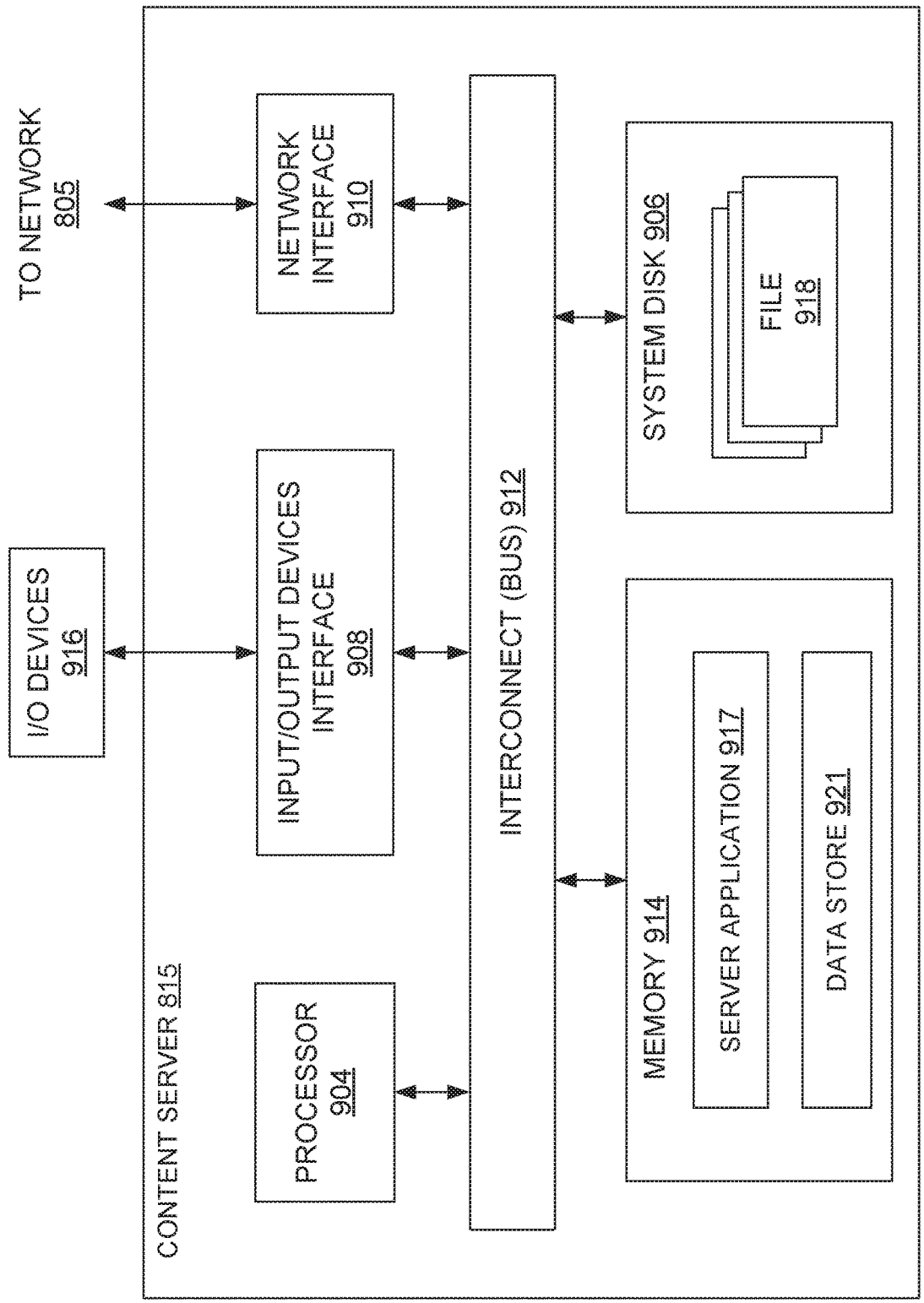
FIG. 9 is a block diagram of a content server that may be implemented in conjunction with the network infrastructure of FIG. 8, according to various embodiments of the present disclosure.

FIG. 9 is a block diagram of a content server 815 that may be implemented in conjunction with the network infrastructure 800 of FIG. 8, according to various embodiments of the present disclosure. As shown, the content server 815 includes, without limitation, a processor 904, a system disk 906, an input/output (I/O) devices interface 908, a network interface 910, an interconnect 912, and a system memory 914.

The processor 904 is included to be representative of a single CPU, multiple CPUs, a single CPU having multiple processing cores, and the like. The processor 904 is configured to retrieve and execute programming instructions, such as a server application 917, stored in the system memory 914. Similarly, the processor 904 is configured to store application data (e.g., software libraries) and retrieve application data from the system memory 914. The interconnect 912 is configured to facilitate transmission of data, such as programming instructions and application data, between the processor 904, the system disk 906, the I/O devices interface 908, the network interface 910, and the system memory 914. The I/O devices interface 908 is configured to receive input data from the I/O devices 916 and transmit the input data to the processor 904 via the interconnect 912. For example, I/O devices 916 may include one or more buttons, a keyboard, a mouse, and/or other input devices. The I/O devices interface 908 is further configured to receive output data from the processor 904 via the interconnect 912 and transmit the output data to the I/O devices 916.

The system disk 906 may include one or more hard disk drives, solid state storage devices, or similar storage devices. The system disk 906 is configured to store non-volatile data such as files 918 (e.g., audio files, video files, subtitles, application files, software libraries, etc.). The files 918, or, more specifically, partitions and/or records associated with one or more files 918, can then be retrieved by one or more endpoint devices 810 via the network 805. In some embodiments, the network interface 910 is configured to operate in compliance with the Ethernet standard.

The system memory 914 includes, without limitation, a server application 917, and a data store 921. The server application 917 is configured to service requests for one or more partitions in one or more files 918 received from the endpoint device 810 and other content servers 815. When the server application 917 receives a request for one or more partitions within one or more files 918, the server application 917 retrieves the corresponding files 918 from the system disk 906 and transmits the materialized partition(s) to an endpoint device 810 or a content server 815 via the network 805. In performing these operations the server application 917 stores data in and retrieves data from the data store 921.

Figure 10:
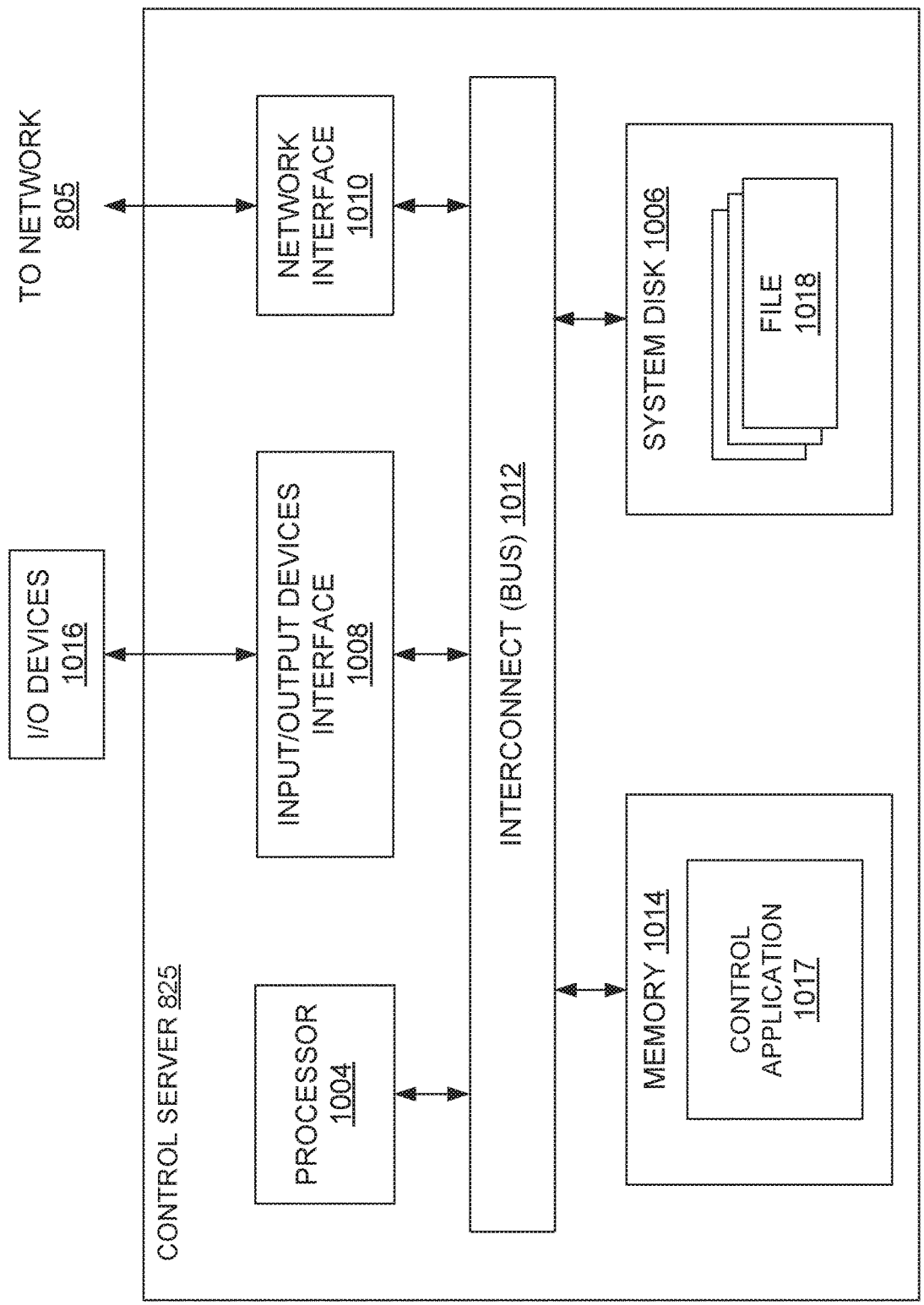
FIG. 10 is a block diagram of a control server that may be implemented in conjunction with the network infrastructure of FIG. 8, according to various embodiments of the present disclosure.

FIG. 10 is a block diagram of a control server 825 that may be implemented in conjunction with the network infrastructure 800 of FIG. 8, according to various embodiments of the present disclosure. As shown, the control server 825 includes, without limitation, a processor 1004, a system disk 1006, an input/output (I/O) devices interface 1008, a network interface 1010, an interconnect 1012, and a system memory 1014.

The processor 1004 is included to be representative of a single CPU, multiple CPUs, a single CPU having multiple processing cores, and the like. The processor 1004 is configured to retrieve and execute programming instructions, such as a control application 1017, stored in the system memory 1014. Similarly, the processor 1004 is configured to store application data (e.g., software libraries) and retrieve application data from the system memory 1014 and a database stored in the system disk 1006. The interconnect 1012 is configured to facilitate transmission of data between the processor 1004, the system disk 1006, the I/O devices interface 1008, the network interface 1010, and the system memory 1014. The I/O devices interface 1008 is configured to transmit input data and output data between the I/O devices 1016 and the processor 1004 via the interconnect 1012. The system disk 1006 may include one or more hard disk drives, solid state storage devices, and the like. The system disk 1006 is configured to store a database of information associated with the content servers 815, the fill source(s) 830, and the files 1018.

The system memory 1014 includes a control application 1017 configured to access information stored in the database and process the information to determine the manner in which specific files 1018 are to be replicated across content servers 815 included in the network infrastructure 800. The control application 1017 may further be configured to receive and analyze performance characteristics associated with one or more of the content servers 815 and/or endpoint devices 810.

Figure 11:
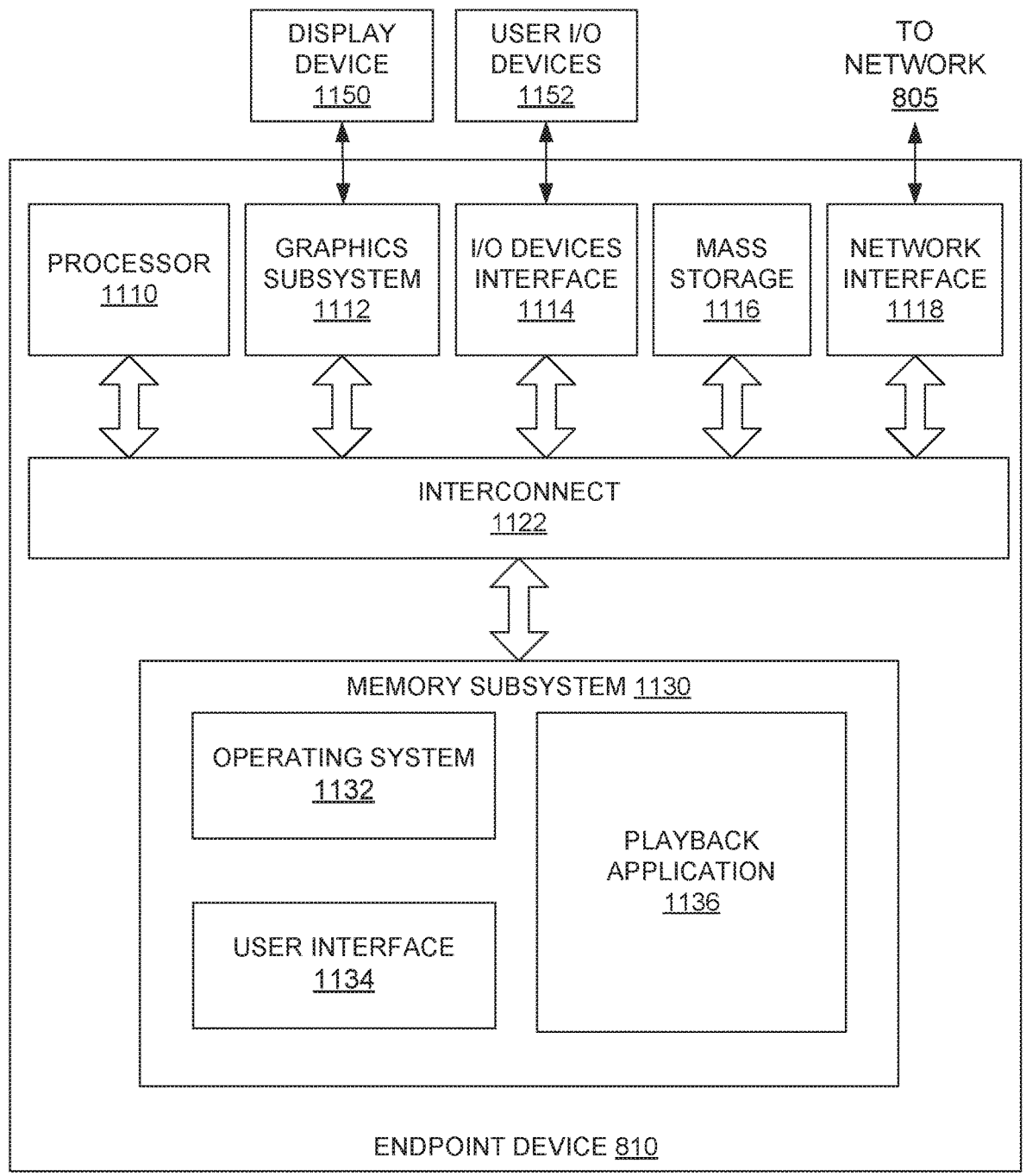
FIG. 11 is a block diagram of an endpoint device that may be implemented in conjunction with the network infrastructure of FIG. 8, according to various embodiments of the present disclosure.

FIG. 11 is a block diagram of an endpoint device 810 that may be implemented in conjunction with the network infrastructure 800 of FIG. 8, according to various embodiments of the present disclosure. As shown, the endpoint device 810 may include, without limitation, a processor 1110, a graphics subsystem 1112, an I/O device interface 1114, a mass storage unit 1116, a network interface 1118, an interconnect 1122, and a memory subsystem 1130.

The processor 1110 is included to be representative of a single CPU, multiple CPUs, a single CPU having multiple processing cores, and the like. In some embodiments, the processor 1110 is configured to retrieve and execute programming instructions stored in the memory subsystem 1130. Similarly, the processor 1110 is configured to store and retrieve application data (e.g., software libraries) residing in the memory subsystem 1130. The interconnect 1122 is configured to facilitate transmission of data, such as programming instructions and application data, between the processor 1110, the graphics subsystem 1112, the I/O devices interface 1114, the mass storage 1116, the network interface 1118, and the memory subsystem 1130.

In some embodiments, the graphics subsystem 1112 is configured to generate frames of video data and transmit the frames of video data to display device 1150. In some embodiments, the graphics subsystem 1112 may be integrated into an integrated circuit, along with the processor 1110. The display device 1150 may comprise any technically feasible means for generating an image for display. For example, the display device 1150 may be fabricated using liquid crystal display (LCD) technology, cathode-ray technology, and light-emitting diode (LED) display technology. An input/output (I/O) devices interface 1114 is configured to receive input data from the user I/O devices 1152 and transmit the input data to the processor 1110 via the interconnect 1122. For example, the user I/O devices 1152 may comprise one or more buttons, a keyboard, and a mouse or other pointing device. The I/O device interface 1114 also includes an audio output unit configured to generate an electrical audio output signal. The user I/O devices 1152 include a speaker configured to generate an acoustic output in response to the electrical audio output signal. In alternative embodiments, the display device 1150 may include the speaker. A television is an example of a device known in the art that can display video frames and generate an acoustic output.

A mass storage unit 1116, such as a hard disk drive or flash memory storage drive, is configured to store non-volatile data. A network interface 1118 is configured to transmit and receive packets of data via the network 805. In some embodiments, the network interface 1118 is configured to communicate using the well-known Ethernet standard. The network interface 1118 is coupled to the processor 1110 via the interconnect 1122.

In some embodiments, the memory subsystem 1130 includes programming instructions and application data that comprise an operating system 1132, a user interface 1134, and a playback application 1136. The operating system 1132 performs system management functions such as managing hardware devices including the network interface 1118, the mass storage unit 1116, the I/O devices interface 1114, and the graphics subsystem 1112. The operating system 1132 also provides process and memory management models for the user interface 1134 and the playback application 1136. The user interface 1134, such as a window and object metaphor, provides a mechanism for user interaction with the endpoint device 810. Persons skilled in the art will recognize the various operating systems and user interfaces that are well-known in the art and suitable for incorporation into the endpoint device 810.

In some embodiments, the playback application 1136 is configured to request and receive content from the content server 815 via the network interface 1118. Further, the playback application 1136 is configured to interpret the content and present the content via the display device 1150 and/or the user I/O devices 1152.

In sum, an anomaly detection system monitors events within a distributed computing system. The anomaly detection system calculates a failure count that is aggregated over a period of time and compares the failure count to a dynamically adjustable threshold. The failure count may be a count of failures occurring within one or more components the distributed computing system, such as a particular edge services cluster, a particular backend service, or a particular backend service in conjunction with a particular edge services cluster.

If the failure count exceeds the dynamically adjustable threshold, then the anomaly detection system indicates a suspected anomaly condition. Subsequently, the anomaly detection system continues to monitor the failure count over a rolling duration of time. For example, the anomaly detection system could calculate a failure count once per second, where the failure count represents the number of failures that have occurred during the most recent ten second period. If the failure count continues to exceed the dynamically adjustable threshold over time, then the anomaly detection system indicates a confirmed anomaly and generates an alert condition.

In addition, the anomaly detection system adjusts the dynamically adjustable threshold after calculating each failure count. If the new failure count exceeds the dynamically adjustable threshold, then the anomaly detection system increments the dynamically adjustable threshold. If, on the other hand, the new failure count is less than the dynamically adjustable threshold, then the anomaly detection system decrements the dynamically adjustable threshold. In this manner, the dynamically adjustable threshold gradually adjusts based on average failure rates that have occurred over time.

At least one technical advantage of the disclosed techniques relative to the prior art is that anomalies are detected with less latency and with greater granularity relative to prior approaches. As a result, system administrators receive indications of alert conditions earlier and can begin resolving the condition that gave rise to the alert condition. In addition, the alert indication includes data that assists the system administrator to quickly identify whether a particular edge services cluster or a particular backend service is at fault. Consequently, the system administrator may more easily identify the portion of the distributed computing system where repair efforts should be focused. These technical advantages represent one or more technological improvements over prior art approaches.

1. In some embodiments, a computer-implemented method, comprises: retrieving event data associated with a stream of events generated by one or more components within a computing system; computing a failure metric based on the event data; determining that the failure metric exceeds a dynamically adjustable trigger condition; and generating an alert associated with the failure metric.

2. The computer-implemented method according to clause 1, further comprising, in response to determining that the failure metric exceeds the dynamically adjustable trigger condition, incrementing the dynamically adjustable trigger condition.

3. The computer-implemented method according to clause 1 or clause 2, further comprising: retrieving second event data associated with the stream of events generated by the one or more components within the computing system; computing a second failure metric associated with the second event data; determining that the second failure metric is less than the dynamically adjustable trigger condition; and in response to determining that the second failure metric is less than the dynamically adjustable trigger condition, decrementing the dynamically adjustable trigger condition.

4. The computer-implemented method according to any of clauses 1-3, wherein the dynamically adjustable trigger condition is associated with a median failure metric related to the event data.

5. The computer-implemented method according to any of clauses 1-4, wherein the failure metric measures a number of failures represented by the event data and associated with a first service operating within the computing system.

6. The computer-implemented method according to any of clauses 1-5, further comprising generating an alert message associated with the alert, wherein the alert message identifies the first service.

7. The computer-implemented method according to any of clauses 1-6, further comprising grouping the events based on which components in the computing system generated the events.

8. The computer-implemented method according to any of clauses 1-7, wherein the failure metric measures a number of failures represented by the event data and associated with a group of components within the computing system.

9. In some embodiments, one or more non-transitory computer-readable storage media include instructions that, when executed by one or more processors, cause the one or more processors to perform the steps of: retrieving event data associated with a stream of events generated by one or more components within a computing system; computing, based on the event data, a metric associated with a first service operating within the computing system; determining that the failure metric exceeds a dynamically adjustable threshold value; and generating an alert associated with the failure metric.

10. The one or more non-transitory computer-readable storage media according to clause 9, further comprising, in response to determining that the failure metric exceeds the dynamically adjustable trigger condition, incrementing the dynamically adjustable trigger condition.

11. The one or more non-transitory computer-readable storage media according to clause 9 or clause 10, further comprising: retrieving second event data associated with the stream of events generated by the one or more components within the computing system; computing a second failure metric associated with the second event data; determining that the second failure metric is less than the dynamically adjustable trigger condition; and in response to determining that the second failure metric is less than the dynamically adjustable trigger condition, decrementing the dynamically adjustable trigger condition.

12. The one or more non-transitory computer-readable storage media according to any of clauses 9-11, wherein the dynamically adjustable trigger condition is associated with a median failure metric related to the event data.

13. The one or more non-transitory computer-readable storage media according to any of clauses 9-12, wherein the failure metric measures a number of failures represented by the event data and associated with the first service.

14. The one or more non-transitory computer-readable storage media according to any of clauses 9-13, further comprising generating an alert message associated with the alert, wherein the alert message identifies the first service.

15. The one or more non-transitory computer-readable storage media according to any of clauses 9-14, wherein the failure metric indicates a number of failures represented by the event data that occurred over a first duration of time.

16. The one or more non-transitory computer-readable storage media according to any of clauses 9-15, further comprising: calculating a first value range associated with second event data associated with a second stream of events generated by the one or more components within the computing system prior to the first event data; calculating a second value range associated with third event data associated with a third stream of events generated by the one or more components within the computing system subsequent to the alert first event data; determining that the second value range is substantially the same as the first value range; and determining that the computing system has recovered from the alert.

17. In some embodiments, a computing device, comprises: a memory that includes instructions; and a processor that is coupled to the memory and, when executing the instructions, is configured to: retrieve event data associated with a stream of events generated by one or more components within a computing system; compute a failure metric associated with a first service operating within the computing system based on the event data; determine that the failure metric exceeds a dynamically adjustable threshold value; and generate an alert associated with the failure metric.

18. The computing device according to clause 17, wherein, when executing the instructions, the processor is further configured to, in response to determining that the failure metric exceeds the dynamically adjustable trigger condition, increment the dynamically adjustable trigger condition.

19. The computing device according to clause 17 or clause 18, wherein, when executing the instructions, the processor is further configured to: retrieve second event data associated with the stream of events generated by the one or more components within the distributed computing system; compute a second failure metric associated with the second event data; determine that the second failure metric is less than the dynamically adjustable trigger condition; and in response to determining that the second failure metric is less than the dynamically adjustable trigger condition, decrement the dynamically adjustable trigger condition.

20. The computing device according to any of clauses 17-19, wherein the dynamically adjustable trigger condition is associated with a median failure metric related to the event data.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure has been described above with reference to specific embodiments. Persons of ordinary skill in the art, however, will understand that various modifications and changes may be made thereto without departing from the broader spirit and scope of the disclosure as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
retrieving first event data associated with a first time period in a real-time stream of events generated by one or more components within a computing system;
computing a first failure metric based on the first event data, wherein the first failure metric includes a count of failed requests occurring within the one or more components of the computing system within the first time period;
comparing the first failure metric with a dynamically adjustable trigger condition;
in response to determining that the first failure metric exceeds the dynamically adjustable trigger condition, generating an alert associated with the first failure metric indicating that the computing system is in an alert condition;
updating a median failure metric based on the first failure metric;
in response to updating the median failure metric, setting the dynamically adjustable trigger condition equal to the updated median failure metric multiplied by a factor, for comparison with a second failure metric associated with a second time period that is subsequent to the first time period;
computing a current range of the first failure metric based on a duration of time that occurs after the alert;
comparing the current range of the first failure metric to a range of the first failure metric occurring prior to the alert to determine that the computing system is no longer in the alert condition; and discontinuing the alert based on the computing system no longer being in the alert condition.

2. The computer-implemented method of claim 1, further comprising:
retrieving second event data associated with the second time period in the real-time stream of events generated by the one or more components within the computing system;
computing the second failure metric based on the second event data associated with the second time period;
updating the median failure metric based on the second failure metric; and
in response to updating the median failure metric based on the second failure metric, setting the dynamically adjustable threshold value equal to the updated median failure metric multiplied by the factor, for comparison with a third failure metric associated with a third time period that is subsequent to the second time period.

3. The computer-implemented method of claim 1, wherein the count of failed requests is associated with a first service operating within the computing system.

4. The computer-implemented method of claim 3, further comprising generating an alert message associated with the alert, wherein the alert message identifies the first service.

5. The computer-implemented method of claim 1, further comprising grouping the events based on which components in the computing system generated the events.

6. The computer-implemented method of claim 1, wherein the first failure metric measures the count of failed requests processed by a combination of the one or more components within the computing system.

7. One or more non-transitory computer-readable storage media including instructions that, when executed by one or more processors, cause the one or more processors to perform the steps of:
retrieving first event data associated with a first time period in a real-time stream of events generated by one or more components within a computing system;
computing, based on the first event data, a first failure metric associated with a first service operating within the computing system, wherein the first failure metric includes a count of failed requests processed by the first service within the first time period;
comparing that the failure metric with a dynamically adjustable threshold value;
in response to determining that the first failure metric exceeds the dynamically adjustable threshold value, generating an alert associated with the first failure metric indicating that the computing system is in an alert condition;
updating a median failure metric based on the first failure metric;
in response to updating the median failure metric, setting the dynamically adjustable threshold value equal to the updated median failure metric multiplied by a factor, for comparison with a second failure metric associated with a second time period that is subsequent to the first time period;
computing a current range of the first failure metric based on a duration of time that occurs after the alert;
comparing the current range of the first failure metric to a range of the first failure metric occurring prior to the alert to determine that the computing system is no longer in the alert condition; and
discontinuing the alert based on the computing system no longer being in the alert condition.

8. The one or more non-transitory computer-readable storage media of claim 7, further comprising:
retrieving second event data associated with the second time period of the real-time stream of events generated by the one or more components within the computing system;
computing the second failure metric based on the second event data associated with the second time period;
updating the median failure metric based on the second failure metric; and
in response to updating the median failure metric based on the second failure metric, setting the dynamically adjustable threshold value equal to the updated median failure metric multiplied by the factor, for comparison with a third failure metric associated with a third time period that is subsequent to the second time period.

9. The one or more non-transitory computer-readable storage media of claim 7, wherein the dynamically adjustable threshold value is associated with a median failure metric related to the first event data.

10. The one or more non-transitory computer-readable storage media of claim 7, wherein the failure metric measures the count of failed requests that have been processed by a combination of the first service and a second service.

11. The one or more non-transitory computer-readable storage media of claim 10, further comprising generating an alert message associated with the alert, wherein the alert message identifies the first service.

12. The one or more non-transitory computer-readable storage media of claim 7, wherein the first failure metric indicates a number of failures represented by the first event data that occurred over a first duration of time.

13. The one or more non-transitory computer-readable storage media of claim 7, further comprising:
calculating a first value range associated with second event data associated with a second real-time stream of events generated by the one or more components within the computing system prior to the first event data;
calculating a second value range associated with third event data associated with a third real-time stream of events generated by the one or more components within the computing system subsequent to the first event data;
determining that the second value range is equivalent to the first value range; and
determining that the computing system has recovered from the alert.

14. A computing device, comprising:
a memory that includes instructions; and
a processor that is coupled to the memory and, when executing the instructions, is configured to:
retrieve first event data associated with a first time period in a real-time stream of events generated by one or more components within a computing system;
compute a first failure metric associated with a first service operating within the computing system based on the first event data, wherein the first failure metric includes a count of failed requests occurring within the one or more components of the computing system within the first time period;
compare that the first failure metric with a dynamically adjustable threshold value;
in response to determining that the first failure metric exceeds the dynamically adjustable threshold value, generate an alert associated with the first failure metric indicating that the computing system is in an alert condition;

update a median failure metric based on the first failure metric;

in response to updating the median failure metric, setting the dynamically adjustable threshold value equal to the updated median failure metric multiplied by a factor, for comparison with a second failure metric associated with a second time period that is subsequent to the first time period;

compute a current range of the first failure metric based on a duration of time that occurs after the alert;

compare the current range of the first failure metric to a range of the first failure metric occurring prior to the alert to determine that the computing system is no longer in the alert condition; and discontinue the alert based on the computing system no longer being in the alert condition.

15. The computing device of claim 14, wherein, when executing the instructions, the processor is further configured to:

retrieve second event data associated with the second time period of the real-time stream of events generated by the one or more components within the computing system;

compute the second failure metric based on the second event data associated with the second time period;

update the median failure metric based on the second failure metric; and in response to updating the median failure metric based on the second failure metric, setting the dynamically adjustable threshold value equal to the updated median failure metric multiplied by the factor, for comparison with a third failure metric associated with a third time period that is subsequent to the second time period.

16. The computing device of claim 14, wherein the dynamically adjustable threshold value is associated with a median failure metric related to the first event data.

* * * * *

UNITED STATES PATENT AND TRADEMARK OFFICE
CERTIFICATE OF CORRECTION

PATENT NO. : 11,929,869 B2
APPLICATION NO. : 16/410867
DATED : March 12, 2024
INVENTOR(S) : Arthur Gonigberg et al.

It is certified that error appears in the above-identified patent and that said Letters Patent is hereby corrected as shown below:

In the Claims

Column 27, Claim 7, Line 45, please delete "that";

Column 28, Claim 14, Line 61, please delete "that".

Signed and Sealed this
Twenty-eighth Day of May, 2024

Katherine Kelly Vidal
*Director of the United States Patent and Trademark Office*